United States Patent
Ohmi

(10) Patent No.: US 9,285,892 B2
(45) Date of Patent: Mar. 15, 2016

(54) NON-CONTACT POSITION SENSING DEVICE AND NON-CONTACT POSITION SENSING METHOD

(75) Inventor: Shinichiro Ohmi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 974 days.

(21) Appl. No.: 13/473,024

(22) Filed: May 16, 2012

(65) Prior Publication Data

US 2012/0232836 A1    Sep. 13, 2012

Related U.S. Application Data

(63) Continuation of application No. PCT/JP2011/004799, filed on Aug. 29, 2011.

(30) Foreign Application Priority Data

Nov. 10, 2010    (JP) .................................. 2010-251456

(51) Int. Cl.
    *G06F 3/03*    (2006.01)
(52) U.S. Cl.
    CPC .... *G06F 3/0304* (2013.01); *G06F 2203/04101* (2013.01)
(58) Field of Classification Search
    CPC ..................... G06F 3/0304; G06F 2203/04101
    USPC .......................................................... 702/150
    See application file for complete search history.

(56) References Cited

U.S. PATENT DOCUMENTS

| | | | |
|---|---|---|---|
| 6,239,789 B1 * | 5/2001 | Sekizawa et al. ............ | 345/173 |
| 2005/0073508 A1 * | 4/2005 | Pittel et al. .................... | 345/175 |
| 2009/0295744 A1 | 12/2009 | Onishi | |
| 2010/0026453 A1 | 2/2010 | Yamamoto et al. | |
| 2010/0225581 A1 | 9/2010 | Kiyose | |
| 2010/0225616 A1 | 9/2010 | Kiyose | |
| 2011/0062316 A1 * | 3/2011 | Kiyose et al. ................. | 250/221 |

FOREIGN PATENT DOCUMENTS

| | | |
|---|---|---|
| JP | 05-053717 | 3/1993 |
| JP | 07-200143 | 8/1995 |
| JP | 2003-256123 | 9/2003 |

OTHER PUBLICATIONS

International Search Report issued in International Patent Appl No. PCT/JP2011/004799 dated Dec. 2011.

* cited by examiner

*Primary Examiner* — Sujoy Kundu
*Assistant Examiner* — Liam R Casey
(74) *Attorney, Agent, or Firm* — McDermott Will & Emery LLP

(57) ABSTRACT

A non-contact position sensing device includes a plurality of infrared LEDs provided in different positions and each being configured to transmit an infrared light ray, a photosensor configured to receive multiple ones of infrared light rays reflected by an object, and a control section configured to calculate a position of the object based on reflected light rays received by the photosensor. The control section switches between intensity position calculation to calculate the position of the object based on intensities of the reflected light rays and phase position calculation to cause intensities of the infrared light rays transmitted from the infrared LEDs to periodically change and calculate the position of the object based on phases of intensity changes of the reflected light rays.

24 Claims, 14 Drawing Sheets

$Q = (A+B+C+D)/4$
FFT IS PERFORMED TO $A-Q$, $B-Q$, $C-Q$, and $D-Q$ TO DETECT PHASE COMPONENT $L0^2 = x^2 + z^2$
$L1^2 = (x+L)^2 + z^2$
$L2^2 = (x-L)^2 + z^2$
$L1 + L0 = a$ : DISTANCE CALCULATED BASED ON PHASE OF FIRST INFRARED LED 51
$L2 + L0 = b$ : DISTANCE CALCULATED BASED ON PHASE OF SECOND INFRARED LED 52

ABOVE EQUATIONS ARE SOLVED TO OBTAIN x AND z (a, b, AND L ARE KNOWN)

NON-CONTACT POSITION SENSING DEVICE AND NON-CONTACT POSITION SENSING METHOD

CROSS-REFERENCE TO RELATED APPLICATION

This is a continuation of PCT International Application PCT/JP2011/004799 filed on Aug. 29, 2011, which claims priority to Japanese Patent Application No. 2010-251456 filed on Nov. 10, 2010. The disclosures of these applications including the specifications, the drawings, and the claims are hereby incorporated by reference in their entirety.

BACKGROUND

The present disclosure relates to non-contact position sensing devices and methods for sensing a position of an object without contact.

In recent years, information terminals and miniature TV terminals, such as personal digital assistants (PDAs), smart phones, tablet PCs, and vehicle navigation systems, etc. have been widely used. Many of such terminals employ a touch input portion in order to increase operability. For example, the touch input portion is formed of a display for displaying screen components such as icons, etc. of a graphical user interface (GUI), and the display is configured to receive input of information when a display screen is touched by a stylus (a touch pen) or a finger. On a display screen of the display, for example, a plurality of screen components such as ions, etc. are displayed, and a user touches the display screen by a stylus or a finger to select an icon, thereby starting an application program assigned to the icon.

As a technique other than the touch input portion, non-contact position sensing techniques using a plurality of infrared LEDs and photosensors have been known. For example, according to a technique disclosed in Japanese Patent Publication No. H7-200143, an infrared light ray with a modulated light intensity is output from a predetermined position, a reflected light ray from an object such as a stylus or user's finger, etc. is received, and a position of the object is detected based on a phase difference between the output light ray and the reflected light ray.

SUMMARY

However, according to the technique of the Japanese Patent Publication No. H7-200143, when the position of the object is too close to a light receiving portion such as a photosensor, etc., a phase detection error is not negligible, and detection accuracy is reduced.

In view of the above-described points, the present invention has been devised, and it is therefore an object of the present disclosure to allow, in a technique for sensing the position of an object, successful detection of the position of the object without contact in a wide range from a near position to a distant position.

To achieve the above-described object, a non-contact position sensing device according to the present disclosure includes a plurality of transmission units provided in different positions, each being configured to transmit a signal, a receiving unit configured to receive the signals reflected by an object, and a control unit configured to calculate a position of the object based on received signals received by the receiving unit, and the control unit switches between intensity position calculation to calculate the position of the object based on intensities of the received signals and phase position calculation to cause intensities of the signals from the transmission units to periodically change and calculate the position of the object based on phases of intensity changes of the received signals, based on the intensities of the received signals.

Another non-contact position sensing device according to the present disclosure includes a transmission unit configured to transmit a signal, a plurality of receiving units provided in different positions, each being configured to receive the signal reflected by an object, and a control unit configured to calculate a position of the object based on the received signals received by the receiving units, and the control unit switches between intensity position calculation to calculate a position of the object based on intensities of the received signals received by the plurality of receiving units and phase position calculation to cause an intensity of the signal from the transmission unit to periodically change and calculate the position of the object based on phases of intensity changes of the received signals received by the plurality of receiving units, based on the intensities of the received signals.

Still another non-contact position sensing device according to the present disclosure includes a transmission unit configured to move with an object and transmit a signal, a plurality of receiving units provided in different positions, each being configured to receive the signal, and a control unit configured to calculate a position of the object based on the received signals received by the receiving units, and the control unit switches between intensity position calculation to calculate a position of the object based on intensities of the received signals received by the plurality of receiving units and phase position calculation to cause an intensity of the signal from the transmission unit to periodically change and calculate the position of the object based on phases of intensity changes of the received signals received by the plurality of receiving units, based on the intensities of the received signals.

A non-contact position sensing method according to the present disclosure includes transmitting signals from a plurality of difference positions, receiving the signals reflected by an object, and performing position calculation of the object based on the received signals, and in the position calculation, intensity position calculation to calculate a position of the object based on intensities of the received signals and phase position calculation to cause, when the signals are transmitted, intensities of the signals to periodically change and calculate the position of the object based on phases of intensity changes of the received signals are switched from one to the other based on the intensities of the received signals.

Another non-contact position sensing method according to the present disclosure includes transmitting a signal, receiving the signals reflected by an object at a plurality of different positions, and performing position calculation of the object based on the received signals, and in the position calculation, intensity position calculation to calculate a position of the object based on intensities of the received signals and phase position calculation to cause, when the signal is transmitted, an intensity of the signal to periodically change and calculate the position of the object based on phases of intensity changes of the received signals are switched from one to the other based on the intensities of the received signals.

Still another non-contact position sensing method according to the present disclosure includes transmitting a signal from a position where an object is located, receiving the signals at a plurality of different positions, and performing position calculation of the object based on the received signals, and in the position calculation, intensity position calculation to calculate a position of the object based on intensities of the received signals and phase position calculation to cause, when the signal is transmitted, an intensity of the signal to periodically change and calculate the position of the object based on phases of intensity changes of the received signals are switched from one to the other based on the intensities of the received signals.

In any one of the above-described non-contact position sensing devices, which of intensity position calculation and phase position calculation is to be used is determined according to the intensity of a signal, and thus, the position of an object can be successfully detected in a wide range.

Using any one of the above-described non-contact position sensing methods, which of intensity position calculation and phase position calculation is to be used is determined according to the intensity of a signal, and thus, the position of an object can be successfully detected in a wide range.

DETAILED DESCRIPTION

Example embodiments will be described in detail below with reference to the accompanying drawings. Examples in which a non-contact position sensing device is incorporated in a miniature TV terminal will be described.

First Embodiment

Figure 1:
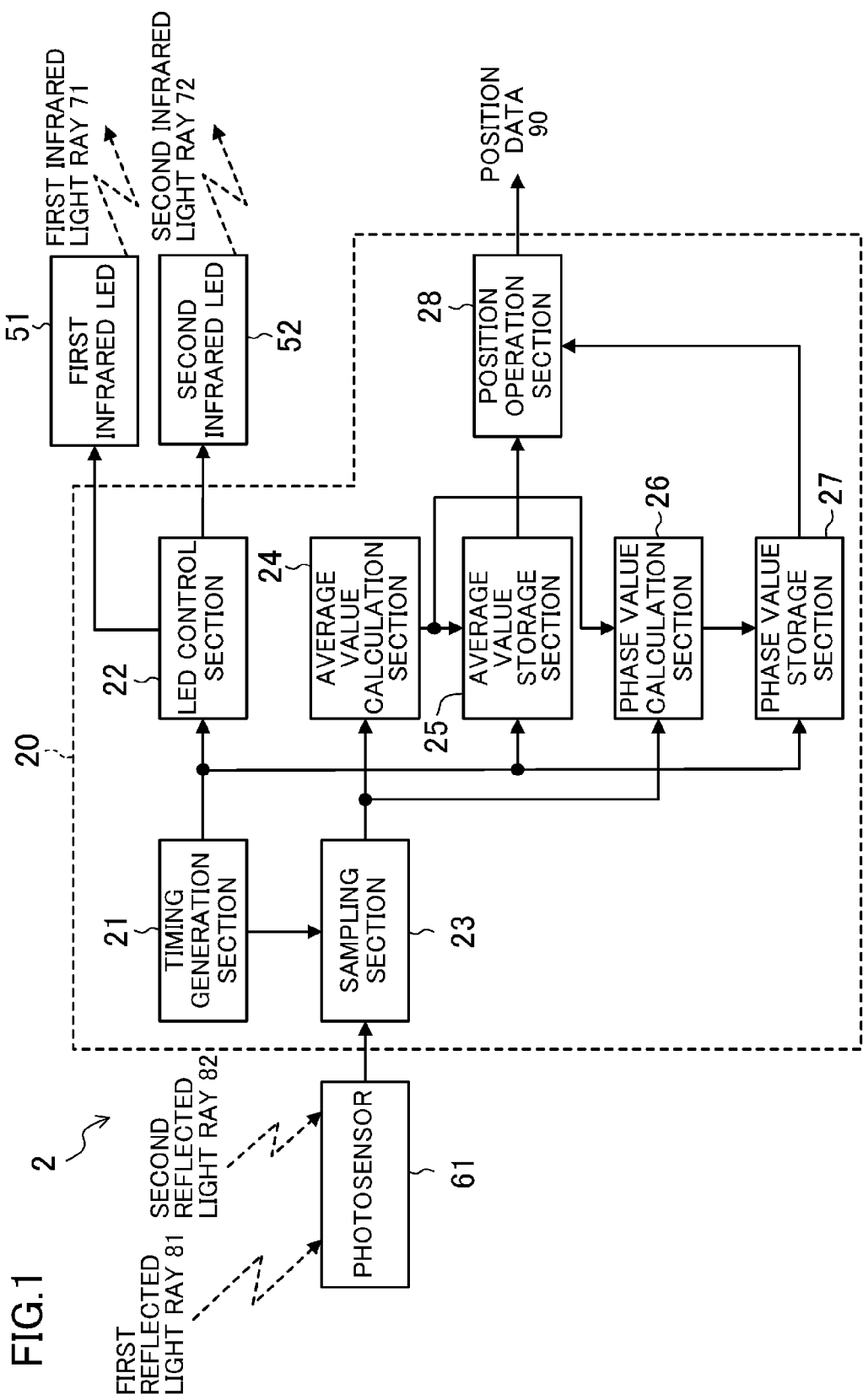
FIG. 1 is a configuration diagram of a non-contact position sensing device according to a first embodiment.
Figure 2:
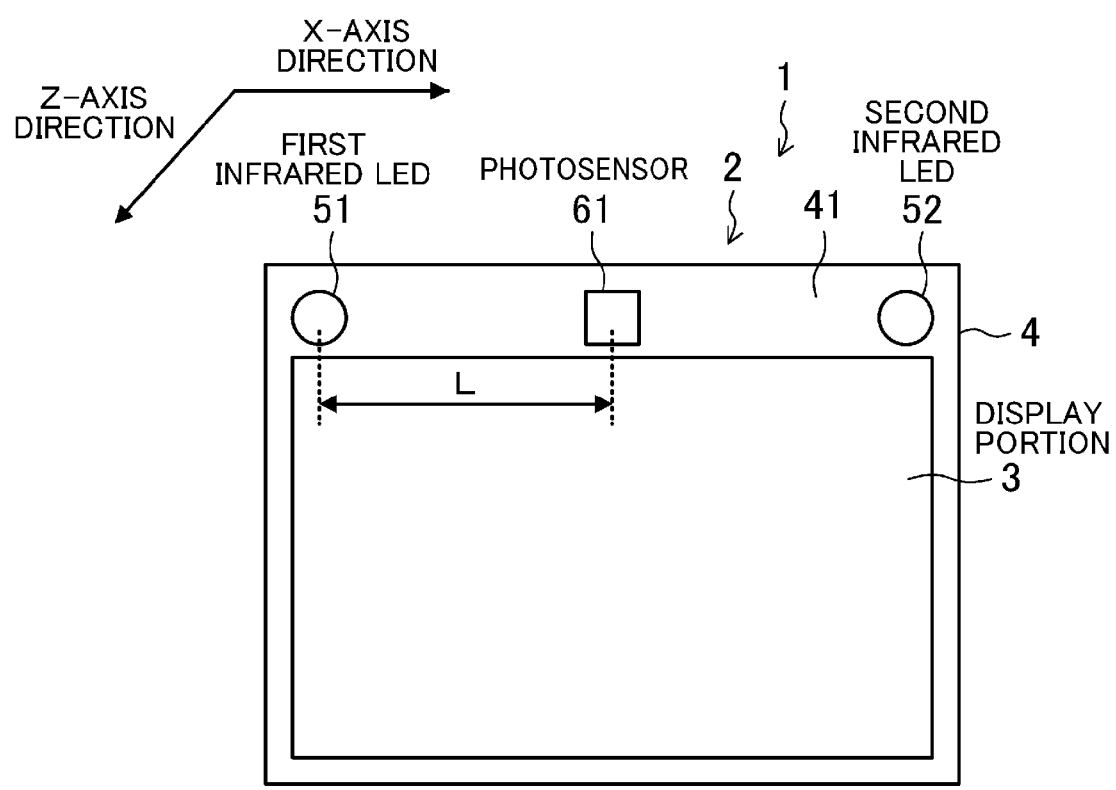
FIG. 2 is a front view illustrating a miniature TV terminal according to the first embodiment.

FIG. 1 is a configuration diagram of a non-contact position sensing device according to a first embodiment. FIG. 2 is a front view illustrating a miniature TV terminal 1 according to the first embodiment.

The miniature TV terminal 1 includes a non-contact position sensing device 2, a display portion 3 having a rectangular shape, and a frame 4 configured to surround the display portion 3 and have a rectangular shape. A longitudinal direction of the miniature TV terminal 1 is an X-axis direction, and a direction perpendicular to the display portion 3 is a Z-axis direction. The display portion 3 displays a TV image, an Internet screen, a sound volume, and a channel, etc. The display portion 3 can possibly display, in addition to the current sound volume and channel, an operating portion for changing the sound volume and the channel. Furthermore, the display portion 3 can display a pointer stick for an input operation by a user. In that case, the pointer is configured so that the display state or color of the pointer changes, so that a current pointing position is clearly shown. Thus, an input operation of the user can be understood easily. The user moves the pointer to specify a link destination via the Internet, or change the channel. The display portion 3 can be formed of a liquid crystal display, an organic EL display, or a plasma display, etc.

The non-contact position sensing device 2 includes first and second infrared LEDs 51 and 52 each of which is configured to output an infrared light ray, a photosensor 61 configured to receive an infrared light ray, and a control section 20 configured to control the first and second infrared LEDs 51 and 52 and the photosensor 61 and calculate the position of an object. The control section 20 includes a timing generation section 21 configured to generate a timing signal for an entire system, an LED control section 22 configured to control the first and second infrared LEDs 51 and 52, a sampling section 23 configured to take in an infrared light ray received by the photosensor 61 in the form of a digital signal, an average value calculation section 24 configured to calculate an average intensity of a reflected light ray based on the digital signal taken by the sampling section 23, an average value storage section 25 configured to store the average intensity calculated by the average value calculation section 24, a phase value calculation section 26 configured to calculate a phase value of the reflected light ray based on the digital signal taken by the sampling section 23, a phase value storage section 27 configured to store the phase value calculated by the phase value calculation section 26, and a position operation section 28 configured to calculate the position of an object based on the stored average intensity or the stored phase value. The control section 20 serves as a control unit.

The first and second infrared LEDs 51 and 52 are provided respectively at both end portions of the frame 4 in a longitudinal direction of a long side portion 41 located upper parts of the display portion 3. Each of the first and second infrared LEDs 51 and 52 is configured to output an infrared light ray. Each of the first and second infrared LEDs 51 and 52 serves as a transmission unit configured to transmit a signal.

The photosensor 61 is provided at a center of the long side portion 41 in the longitudinal direction thereof. The photosensor 61 is configured to receive an infrared light ray and convert the received infrared light ray into a voltage. The photosensor 61 serves as a receiving unit configured to receive a signal.

As described in detail later, the infrared light rays output from the first and second infrared LEDs 51 and 52 illuminate a finger of a user (an operator) or a stylus of the miniature TV terminal 1 to be reflected, and the reflected infrared light rays are received by the photosensor 61. The received reflected light ray is analyzed, and the position of an object is calculated. The first and second infrared LEDs 51 and 52 serve as a plurality of transmission units each of which is configured to transmit a signal, and the photosensor 61 serves as a receiving unit configure to receive reflected signals transmitted from the plurality of transmission units and reflected by the object. In this case, each of the signals is an infrared light ray.

The timing generation section 21 generates a timing signal for an entire system, and supplies the timing signal to each section. The timing signal for the entire system includes a sampling timing signal and a LED switching timing signal. For example, the sampling timing signal is a clock signal having a frequency of 120 MHz. The switching timing signal is a binary signal of "0" or "1", and "0" and "1" are switched over at 30 MHz. That is, the switching timing signal is generated based on the sampling timing signal so that "0" and "1" are switched over every four clocks.

Figure 3:
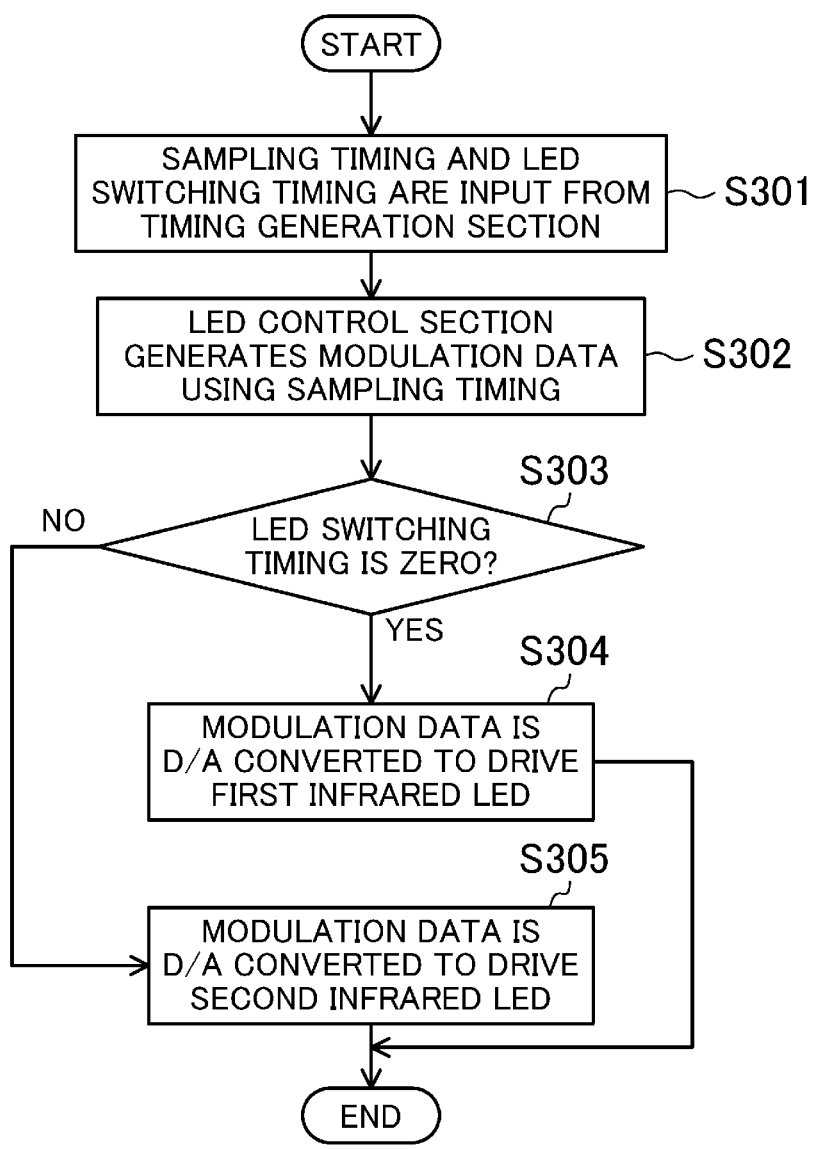
FIG. 3 is a flowchart showing process steps performed in a LED control section.
Figure 4:
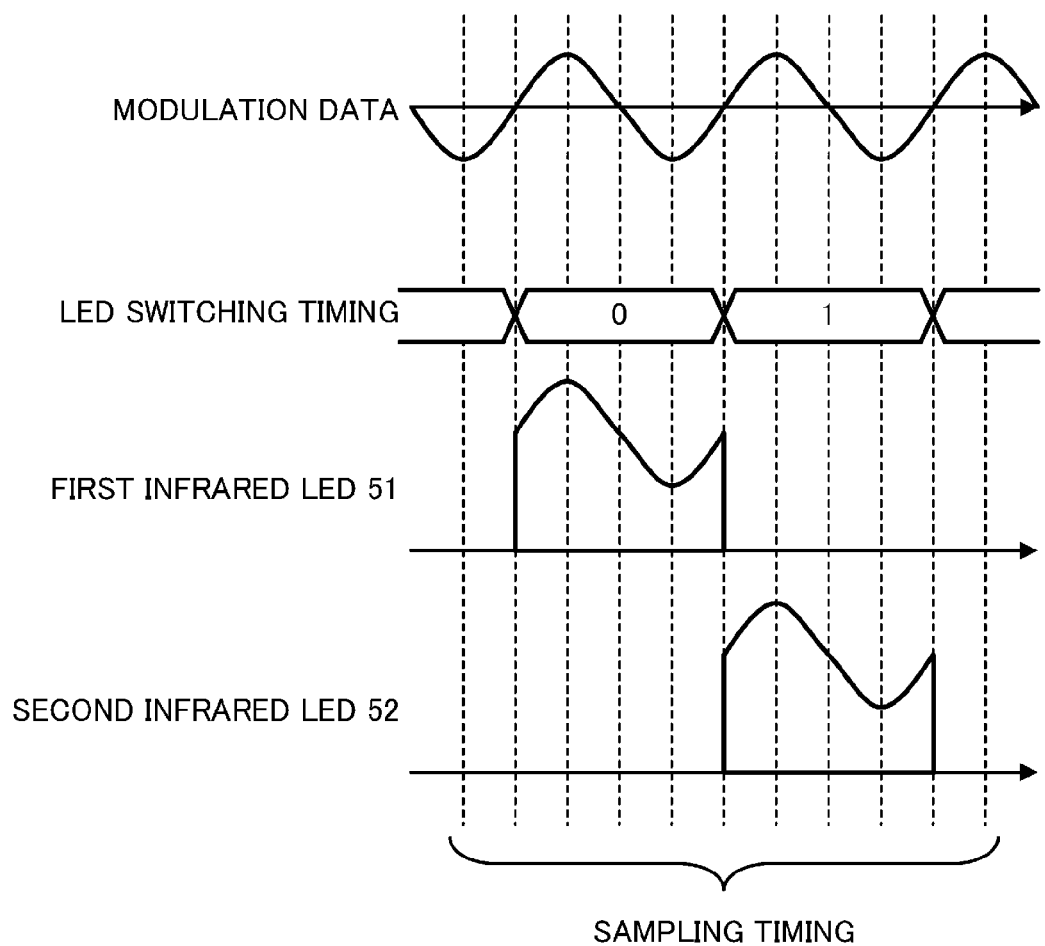
FIG. 4 is a chart showing a modulation pattern of a light ray output from each infrared LED.

The LED control section 22 controls the first and second infrared LEDs 51 and 52 so that each of the first and second infrared LEDs 51 and 52 outputs an infrared light ray. The LED control section 22 generates a driving signal for driving the first and second infrared LEDs 51 and 52 using the sampling timing signal and the switching timing signal. FIG. 3 is a flowchart showing process steps performed in the LED control section 22. FIG. 4 is a chart showing a modulation pattern of a light ray output from each of the first and second infrared LEDs 51 and 52.

First, the LED control section 22 receives the timing sampling signal and the switching timing signal from the timing generation section 21 (S301). Vertical dashed lines provided at regular intervals in FIG. 4 indicate rising and falling edges of the sampling timing signal which is a clock signal. That is, the vertical dashed lines represent sampling timings.

The LED control section 22 generates modulation data with a sine waveform using the sampling timing signal (S302). Specifically, the LED control section 22 generates modulation data which is a sin wave or a cos wave and whose phase is turned to be zero at a timing when the logic value of the switching timing signal is switched between "0" and "1". The LED control section 22 determines whether or not the switching timing signal is "0" (S308), and if the switching timing signal is "0," the LED control section 22 drives the first infrared LED 51 using the modulation data (S304). While the switching timing signal is "0," the first infrared LED 51 continues to be driven. Specifically, the LED control section 22 adds an offset to the modulation data to generate a driving signal. That is, each driving signal is a signal whose amplitude when an on/off rectangular wave is on is modulated by the modulation data. The modulation data for each driving signal represents a sin wave corresponding to one cycle, and the phase of the modulation data at a start time is zero. The LED control section 22 performs DA conversion of the driving signal to output the obtained signal to the first infrared LED 51. Then, as shown in FIG. 4, while the switching timing signal is "0," the first infrared LED 51 outputs an infrared light ray whose intensity is periodically modulated according to the modulation data, and more specifically, is sinusoidally modulated. On the other hand, if the switching timing is "1," the LED control section 22 drives the second infrared LED 52 using modulation data (S305). While the switching timing signal is "1," the second infrared LED 52 continues to be driven. The details of control are the same as those when the LED control section 22 drives the first infrared LED 51. As a result, as shown in FIG. 4, while the switching timing signal is "1," the second infrared LED 52 outputs an infrared light ray whose intensity is periodically modulated according to the modulation data, and more specifically, is sinusoidally modulated. Thus, the first and second infrared LEDs 51 and 52 alternately output an infrared light ray whose intensity is modulated, according to the switching timing signal.

In this case, process steps performed for calculation of a phase difference of the reflected light ray, which will be described later, can be simplified by using the modulation data whose phase is zero at a switching point of the switching timing signal. However, the modulation data is not limited thereto.

Figure 5:
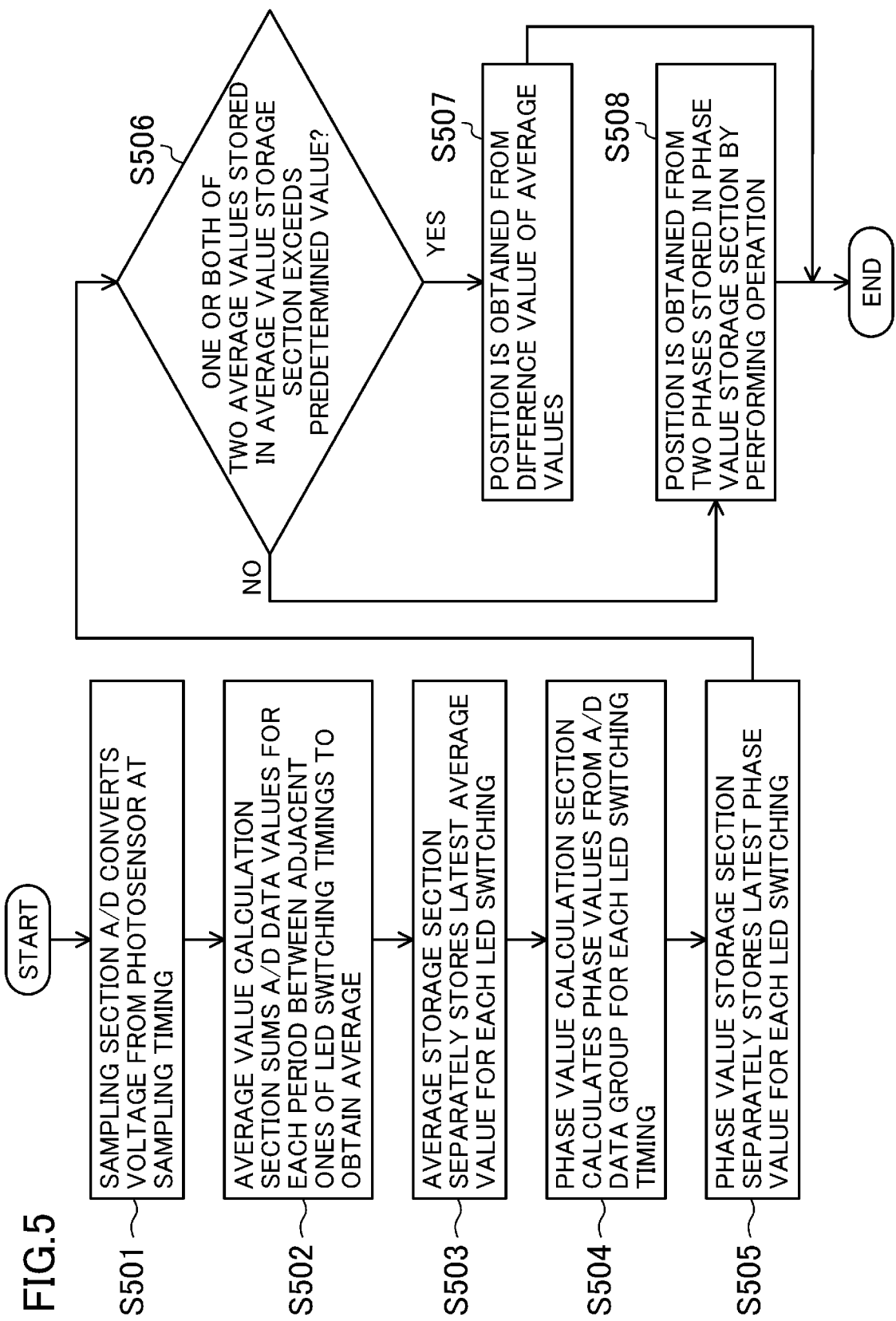
FIG. 5 is a flowchart showing process steps of processing received reflected light rays.
Figure 6:
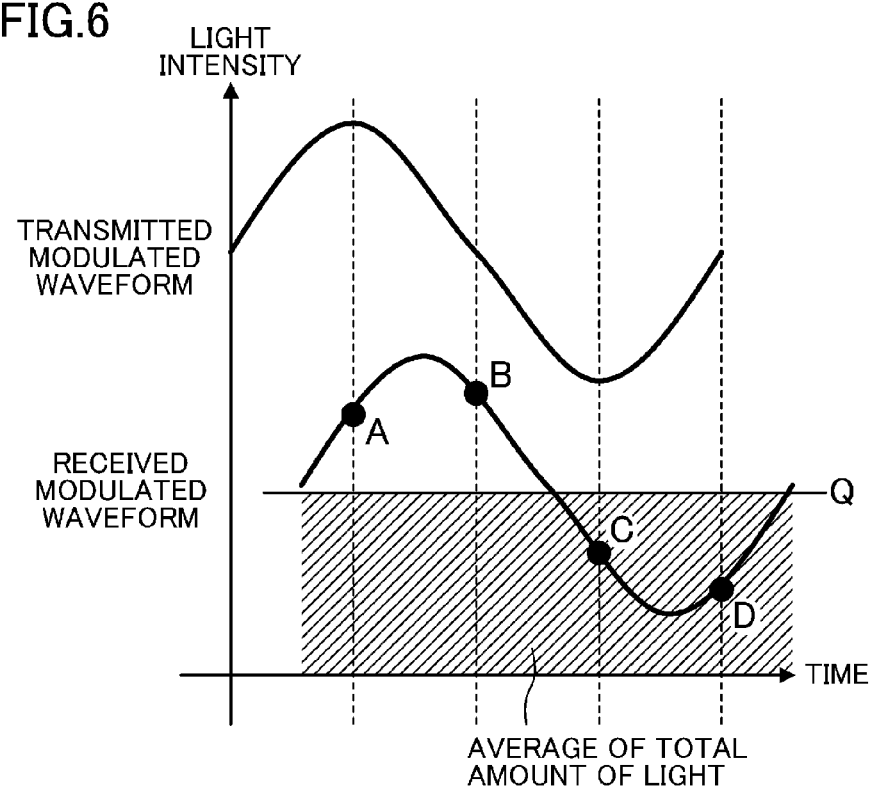
FIG. 6 is a waveform chart showing a transmission signal and a received signal.

Subsequently, process steps of calculating the position of an object such as a finger or a stylus, etc. based on reflected light rays will be described below. FIG. 5 is a flowchart showing process steps of processing of received reflected light rays. FIG. 6 is a waveform chart showing each of a transmission signal and a received signal.

The sampling timing signal and the switching timing signal from the timing generation section 21 and a detected voltage from the photosensor 61 are input to the sampling section 23. The sampling section 23 takes in the detected voltage from the photosensor 61 by performing AD conversion at sampling timing generated by the sampling timing signal in a period corresponding to the switching timing signal (S501). As a result, as shown in FIG. 6, the sampling section 23 obtains four values A, B, C, and D as sample data. The sampling section 23 obtains a reflected light ray corresponding to the first infrared LED 51, and a reflected light ray corresponding to the second infrared LED 52. The sampling section 23 inputs the taken sample data values (A, B, C, and D) to the average value calculation section 24 and the phase value calculation section 26 with the associated type of the switching timing signal. The type of the switching signal corresponds to the type of the infrared LED, i.e., the first infrared LED 51 or the second infrared LED 52, which has output an infrared light ray.

Next, the average value calculation section 24 averages the magnitude of sample data (A, B, C, and D) in one cycle of the switching timing signal, and obtains an average value Q=(A+B+C+D)/4 of the intensity of a reflected light ray (S502). The average value of the intensity will be hereinafter also referred to as an average intensity. Thus, the average value calculation section 24 obtains the average intensity of a reflected light ray corresponding to the first infrared LED 51 and the average intensity of a reflected light ray corresponding to the second infrared LED 52. The average value calculation section 24 inputs each of the average intensities to the average value storage section 25 and the phase value calculation section 26.

The average value storage section 25 stores an average intensity Q of a reflected light ray corresponding to the first infrared LED 51 and an average intensity Q of a reflected light ray corresponding to the second infrared LED 52 (S503). The average value storage section 25 separately stores the latest one of the average intensities Q which are sequentially input, for each of the first infrared LED 51 and the second infrared LED 52.

The phase value calculation section 26 subtracts the average intensity Q calculated by the average value calculation section 24 from the sample data (A, B, C, and D) in one cycle of the switching timing signal, and performs Fourier transform to the subtracted data (A−Q, B−Q, C−Q, and D−Q). Then, the phase value calculation section 26 obtains a complex number having the largest absolute value (power value) from complex data obtained by Fourier transform, and obtains a phase value (argument) of the complex number having the largest absolute value (S504). Specifically, the phase value calculation section 26 performs an arctangent operation based on actual and imaginary number components of the complex number having the largest value to calculate a phase value. In this case, since the sampling timing of a reflected light ray is delayed from the switching timing of the switching timing signal, the obtained phase value is corrected to eliminate a fixed delay. In FIG. 6, sampling is started after a lapse of ¼ cycles from a start (switching) of the switching timing signal, and therefore, the ¼ cycles (π/2 as a phase value) of the switching timing signal is subtracted from the obtained phase value. Thus, the phase value of a reflected light ray is obtained. In this case, the phase value of an output light ray is zero, and the phase value of a reflected light ray means a phase difference between the output light ray and the reflected light ray. The phase value calculation section 26 obtains a phase value for each of the reflected light ray corresponding to the first infrared LED 51 and the reflected light ray corresponding to the second infrared LED 52. Note that when the phase value of an output light ray is not zero, the phase value of the output light ray is subtracted from the phase value of the reflected light ray to obtain a phase difference therebetween.

The phase value storage section 27 stores the obtained phase values of the reflected light ray corresponding to the first infrared LED 51 and the reflected light ray corresponding to the second infrared LED 52 (S505). The phase value storage section 27 separately stores a latest one of phase values which are sequentially input, for each of the first infrared LED 51 and the second infrared LED 52.

The position operation section 28 reads out the average intensity Q of a reflected light ray corresponding to the first infrared LED 51 and the average intensity Q of a reflected light ray corresponding to the second infrared LED 52 which are stored in the average value storage section 25, and determines whether or not at least one of the average intensities exceeds a predetermined threshold (S506). When at least one of the average intensities exceeds the predetermined threshold, the position operation section 28 performs intensity position calculation to calculate the position of the object based on the intensities of reflected light rays (S507), and on the other hand, and if both of the average intensities are equal to or less than the predetermined threshold, the position operation section 28 performs phase position calculation to calculate the position of the object based on the phases of intensity changes of reflected light rays (S508). The predetermined threshold is the smallest one of values for the intensity which allow intensity position calculation which will be described later.

Figure 7:
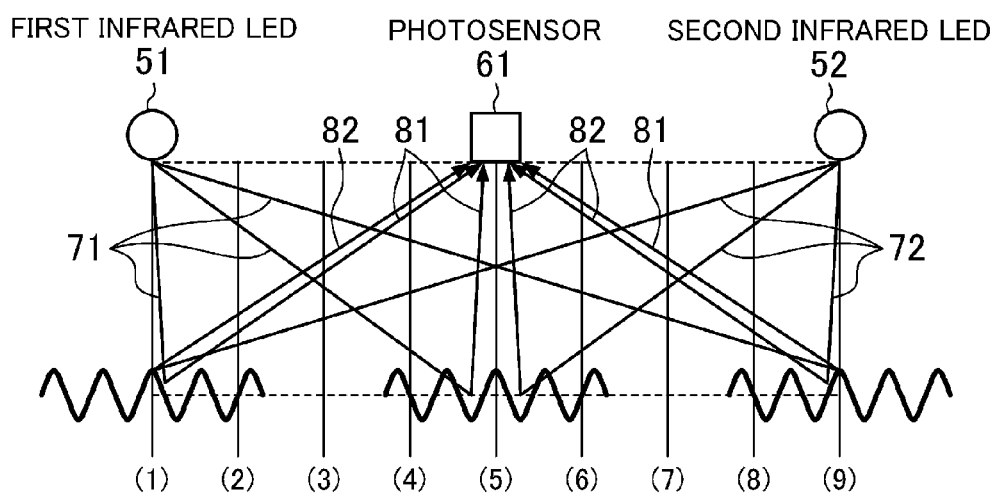
FIG. 7 is a conceptual chart illustrating position detection based on light intensity difference.
Figure 8:
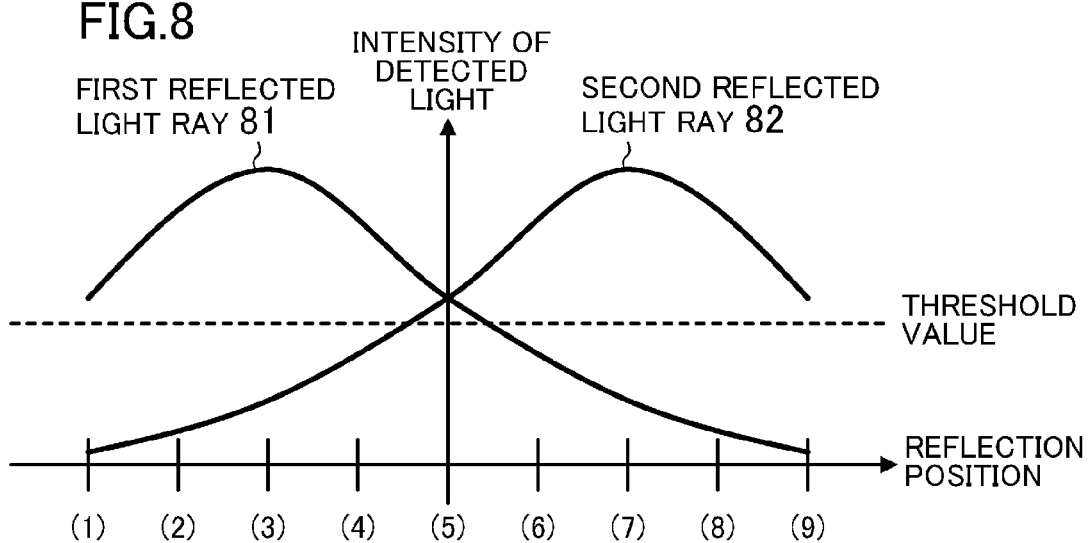
FIG. 8 is a conceptual chart showing the relationship between the position of an object and the intensities of reflected light rays.

First, intensity position calculation will be described with reference to FIGS. 7 and 8. FIG. 7 is a conceptual chart illustrating position detection based on light intensity difference. FIG. 8 is a conceptual chart showing the relationship between the position of an object and the intensities (average intensities) of reflected light rays. An output light ray output from the first infrared LED 51 will be referred to as a first output light ray 71, a reflected light ray corresponding thereto will be referred to as a first reflected light ray 81, an output light ray output from the second infrared LED 52 will be referred to as a second output light ray 72, and a reflected light ray corresponding thereto will be referred to as a second reflected light ray 82.

Intensity position calculation utilizes attenuation of a light intensity. Specifically, as a light ray propagates, the intensity of the light ray attenuates, and therefore, the intensity of a reflected light ray varies according to the position of an object. For example, in FIG. 7, when a finger as an object is located at a position (1), the intensity of the second reflected light ray 82 is small, as compared to the intensity of the first reflected light ray 81. When the finger is located at a position (9), an opposite result is obtained. Also, when the finger is located at a position (5) which is located in the middle, the intensities of the first reflected light ray 81 and the second reflected light ray 82 are about the same. The relationship between the position of the object and the intensities of reflected light rays can be obtained by actual measurement or simulation. A graph shown in FIG. 8 is obtained and stored in advance. The position operation section 28 compares the ratio between the intensity of the first reflected light ray 81 and the intensity of the second reflected light ray 82 to the graph, and calculates the position of the finger (S507). The position operation section 28 outputs the position of the finger as position data 90. Note that instead of a graph, a table showing the relationship between the position of an object and the intensities of reflected light rays may be stored in advance. In that case, the position operation section 28 may be configured to select data most approximated to the intensities of actual reflected light rays from intensities in the table and determine that the finger is located at a position corresponding to the most approximated data.

Figure 9:
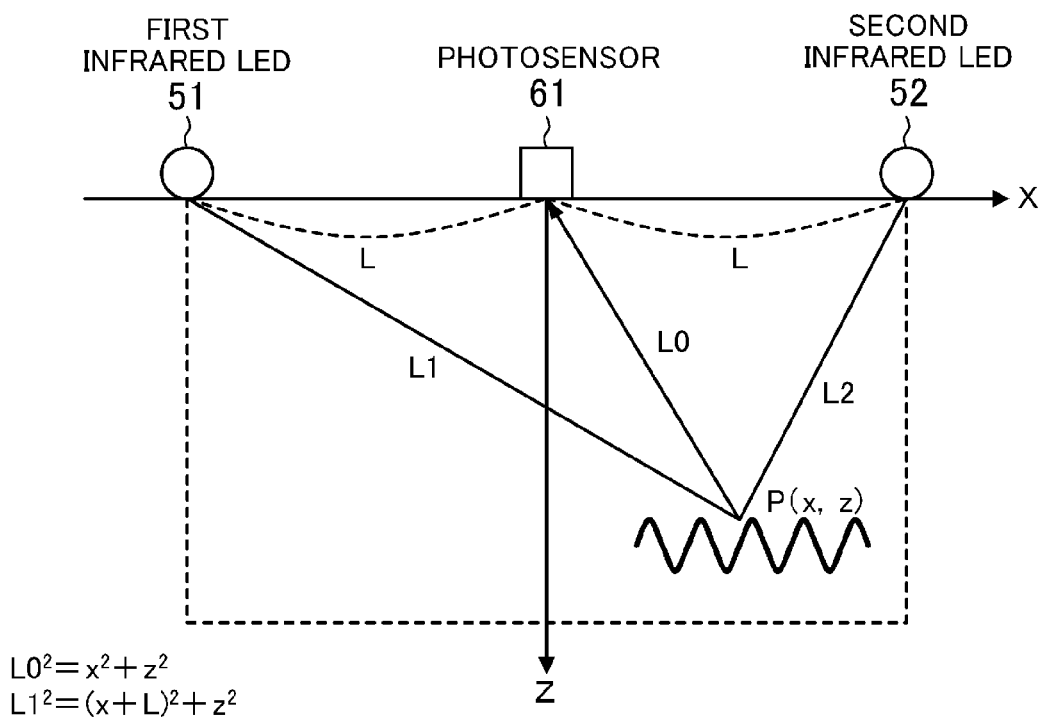
FIG. 9 is a conceptual chart illustrating position detection based on phase difference.

Next, phase position calculation will be described with reference to FIG. 9. FIG. 9 is a conceptual chart illustrating position detection based on phase difference. Note that the phase difference means a phase difference of an intensity change of an infrared light ray.

An intensity change of an output light ray is controlled by the LED control section 22, and the cycle of the change is known. Therefore, a propagation distance of a light ray can be calculated based on a phase value of a reflected light ray. Specifically, the position operation section 28 reads out a phase value of the first reflected light ray 81 and a phase value of the second reflected light ray 82, which are stored in the phase value storage section 27. As described above, each of the phase values corresponds to a phase difference between an output light ray and a reflected light ray. In this case, since the frequency of an intensity change of each of the first and second output light rays 71 and 72 is 30 MHz, the cycle the frequency is 33.33 ns, and the cycles of the first and second reflected light rays 81 and 82 are obviously the same. Based on the phase values and cycles of the first and second reflected light rays 81 and 82, a propagation time from the time when an infrared light ray is output from each of the first and second infrared LEDs 51 and 52 to the time when the infrared light ray reflected by a finger is received by the photosensor 61 can be obtained. The speed of an infrared light ray is known, and therefore, a propagation distance can be calculated from the propagation time and the speed of an infrared light ray.

When it is assumed that a distance from the first infrared LED 51 to a finger is L1, a distance from the second infrared LED 52 to the finger is L2, and a distance from the finger to the photosensor 61 is L0, a distance from the first infrared LED 51 to the photosensor 61 via the finger is represented by L1+L0, and a distance from the second infrared LED 52 to the photosensor 61 via the finger is represented by L2+L0. Then, when it is assumed that a propagation distance calculated based on a phase value of the first reflected light ray 81 is a, and a propagation distance calculated based on a phase value of the second reflected light ray 82 is b, the following equations hold.

$$L1+L0=a \quad \text{[Equation 1]}$$

$$L2+L0=b \quad \text{[Equation 2]}$$

Figure 11:
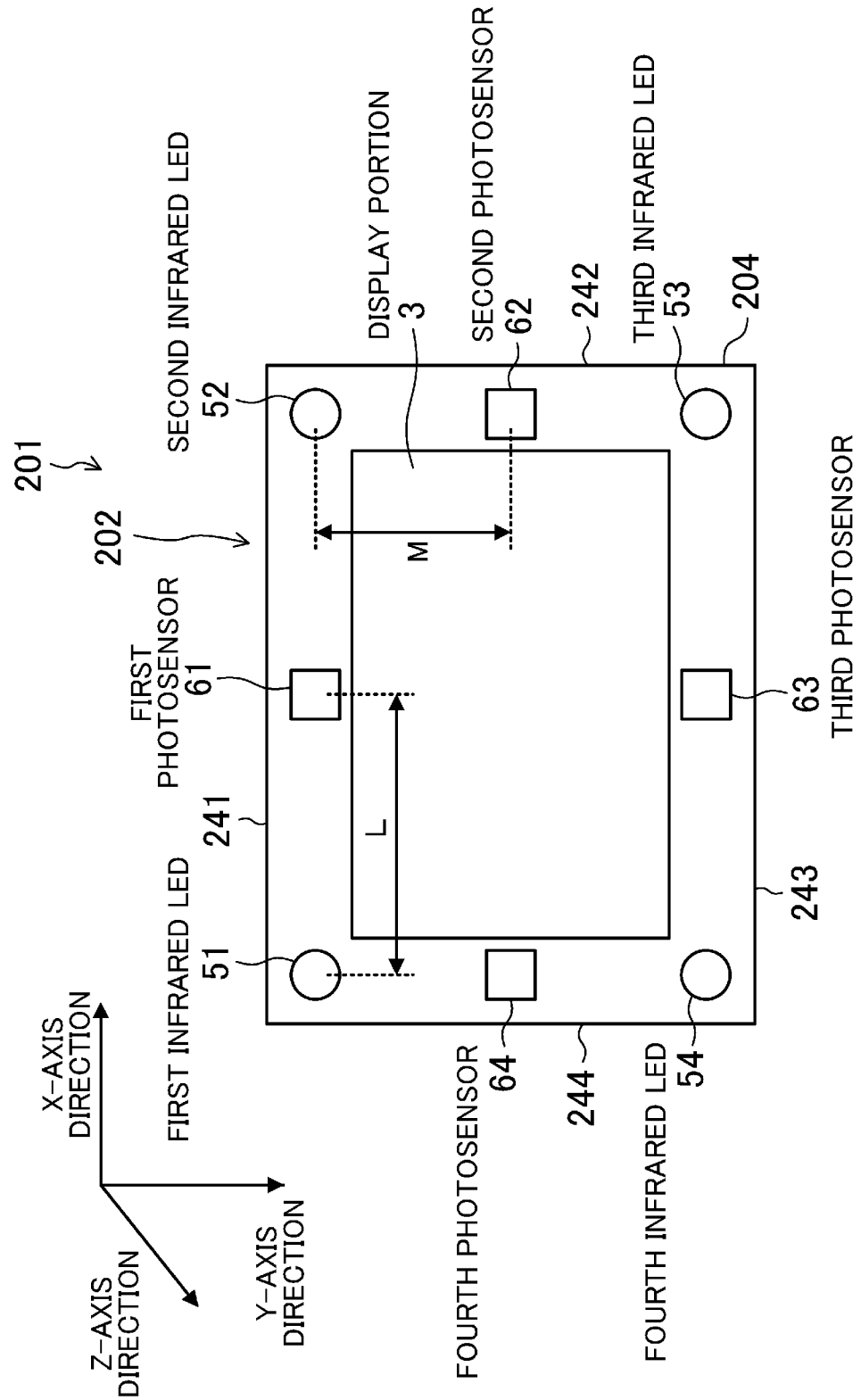
FIG. 11 is a front view of a miniature TV terminal according to the second embodiment.

Then, as shown in FIG. 9, with the photosensor 61 serving as a point of origin, an X-axis (a side thereof including the second infrared LED 52 is the positive side) is provided along a direction in which the first infrared LED 51, the second infrared LED 52, and the photosensor 61 align with one another, a Z-axis (a side thereof closer to an operator is the positive side) is provided along a direction perpendicular to a screen of the miniature TV terminal 1, and a Y-axis (a side thereof closer to the third photosensor 63 (as shown in FIG. 11) is the positive side) is provided along a direction toward the third photosensor 63 (as shown in FIG. 11). Thus, the position of the finger is represented by P (x, y). Also, since the first and second infrared LEDs 51 and 52 are provided respectively at both the end portions of the frame 4 in the longitudinal direction of the long side portion 41, and the photosensor 61 is provided at the center of the long side portion 41 in the longitudinal direction thereof, the distance from the first infrared LED 51 to the photosensor 61 and the distance from the second infrared LED 52 to the photosensor 61 are equal to each other. The distances will be referred to as a distance L. The distance L is known. In this case, the following equations hold.

$$L0^2 = x^2 + z^2 \quad \text{[Equation 3]}$$

$$L1^2 = (x+L)^2 + z^2 \quad \text{[Equation 4]}$$

$$L2^2 = (x-L)^2 + z^2 \quad \text{[Equation 5]}$$

The position P (x, z) can be obtained by solving the above set of simultaneous equations 1-5. The position operation section 28 performs the calculation to obtain the position of the finger. The position operation section 28 outputs the position P (x, z) of the finger as the position data 90.

A higher level middleware or an application program performs control corresponding to the position of the finger using the position data 90. For example, such a middleware or an application program performs channel change and volume adjustment of the miniature TV terminal 1.

According to this embodiment, which of intensity position calculation and phase position calculation is to be used is determined depending on the intensities of reflected light rays. Specifically, when the finger is located relatively close to the miniature TV terminal 1, the average intensity of a reflected light ray is large, and therefore, at least one of the average intensities of the first and second reflected light rays 81 and 82 exceeds a predetermined threshold. As a result, the position of the finger is obtained by intensity position calculation. On the other hand, when the finger is located relatively far from the miniature TV terminal 1, the average intensity of a reflected light ray is small, and therefore, both of the average intensities of the first and second reflected light rays 81 and 82 are equal to or lower than the predetermined threshold. As a result, the position of the finger is obtained by phase position calculation.

When the propagation distance of an infrared light ray is small, an influence of error at the time of detection relative to a phase value is relatively large, and a problem arises in which accuracy of position detection is reduced. On the other hand, when the propagation distance of an infrared light ray is large, it is difficult to detect an intensity difference of a light ray, and a problem arises in which an output of an infrared light ray has to be increased.

In this embodiment, when the propagation distance of an infrared light ray is small, intensity position calculation is used, and when the propagation distance of an infrared light ray is large, phase position calculation is used. Thus, shortcomings of intensity position calculation and phase position calculation can be made up for by each other, and only advantages of both of intensity position calculation and phase position calculation can be used to detect the position of an object. As a result, the position of an object can be detected successfully in a wide range.

In this case, the control unit is configured to perform the intensity position calculation when the intensity of a reflected light ray of a light ray from at least one of the light emitting units exceeds a predetermined threshold, and perform the phase position calculation when the intensities of reflected light rays of light rays from all of the light emitting units are equal to or lower than the predetermine threshold. Specifically, when at least one of the average intensities of infrared light rays is about a level at which intensity position calculation can be performed, the control section 20 performs intensity position calculation, not phase position calculation. Thus, phase detection performance can be increased. That is, when at least one of the average intensities of infrared light rays is large, it is meant that at least one of the propagation distances of infrared light rays is small and thus it is difficult to detect a phase difference. Therefore, position detection performance can be increased by performing intensity position calculation when at least one of the average intensities of infrared light rays is large.

However, the control unit may be configured to perform the intensity position calculation when the intensities of reflected light rays of light rays from all of the light emitting units exceed the predetermined threshold, and perform the phase position calculation when the intensity of a reflected light ray of a light ray from at least one of the light emitting units is equal to or lower than the predetermined threshold. Thus, an intensity difference between two infrared light rays can be clearly detected, so that detection capability of phase position calculation can be increased.

Second Embodiment 2

Figure 10:
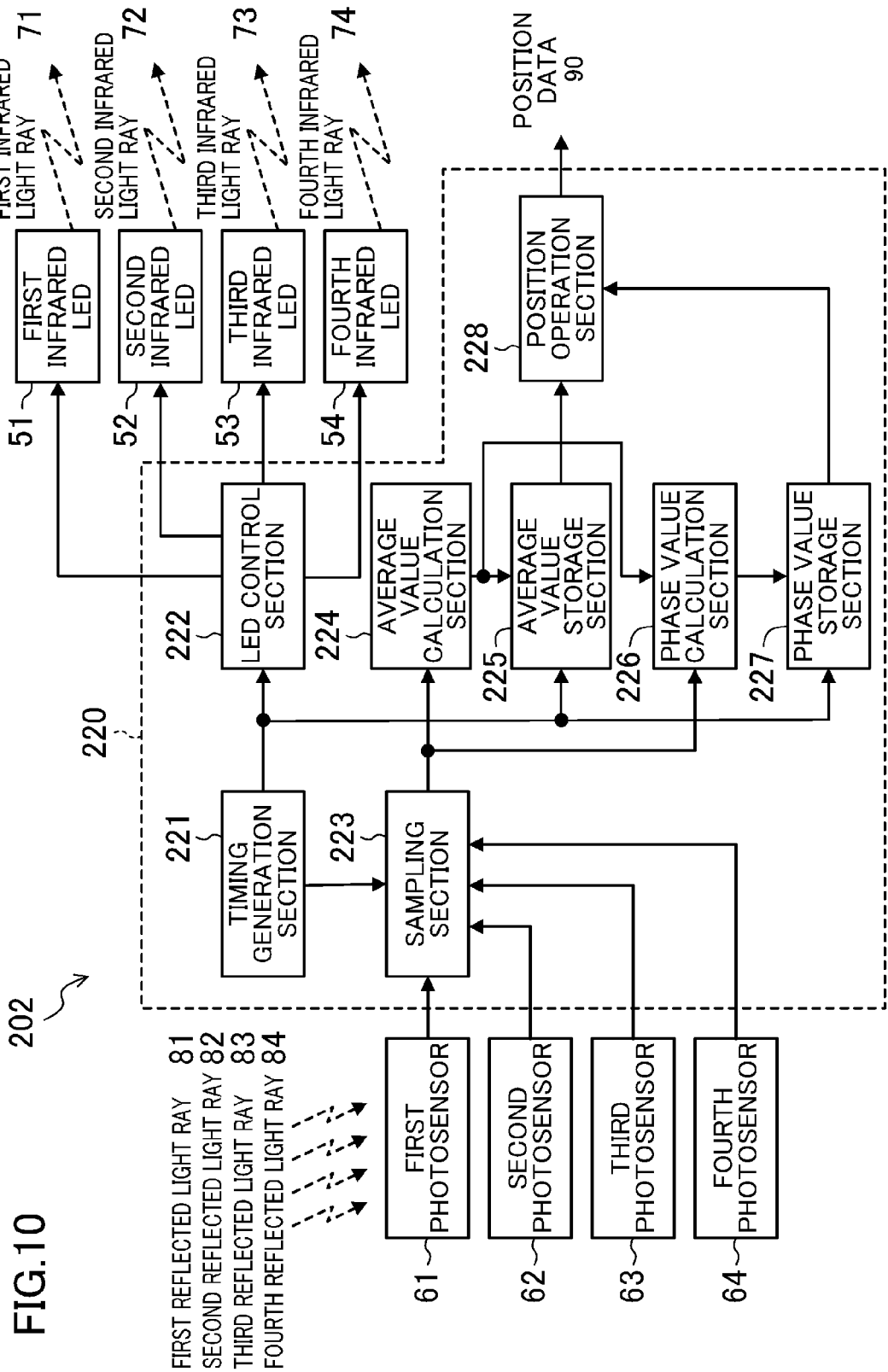
FIG. 10 is a configuration diagram of a non-contact position sensing device according to a second embodiment.

Subsequently, a miniature TV terminal according to a second embodiment will be described. FIG. 10 is a configuration diagram of a non-contact position sensing device according to the second embodiment. FIG. 11 is a front view of a miniature TV terminal 201. The miniature TV terminal 201 of the second embodiment is different from the miniature TV terminal 1 of the first embodiment in the numbers and arrangement of LEDs and photosensors. Therefore, like elements to those of the first embodiment will be denoted by like reference characters and will be not described below. The description will be given with focus on the differences therebetween.

The miniature TV terminal 201 includes, as shown in FIG. 11, a display portion 3 having a rectangular shape, a frame 204 configured to surround the display portion 3 and have a rectangular shape, and a non-contact position sensing device 202. A longitudinal direction of the miniature TV terminal 201 is an X-axis direction, a lateral direction thereof is a Y-axis direction, and a direction perpendicular to the display portion 3 is a Z-axis direction.

An infrared LED is provided at each of four corner portions of the frame 204. Specifically, as facing the display portion 3, a first infrared LED 51 is provided at an upper left corner portion, a second infrared LED 52 is provided at an upper right corner portion, a third infrared LED 53 is provided at a lower right corner portion, and a fourth infrared LED 54 is provided at a lower left corner portion. The first through fourth infrared LEDs 51-54 serve as transmission units each of which is configured to transmit a signal.

A photosensor is provided at each of four sides of the frame 204. Specifically, as facing the display portion 3, a first photosensor 61 is provided at a center of an upper long side portion 241 in a longitudinal direction thereof, a second photosensor 62 is provided at a center of a right short side portion 242 in a longitudinal direction thereof, a third photosensor 63 is provided at a center of a lower long side portion 243 in a longitudinal direction thereof, and a fourth photosensor 64 is provided at a center of a left short side portion 244 in a longitudinal direction thereof. The photosensor 61 receives reflected light rays, which have been output from the first and second infrared LEDs 51 and 52 and reflected by an object of a finger, etc. The second photosensor 62 receives reflected light rays, which have been output from the second and third infrared LEDs 52 and 53 and reflected by the object of the finger, etc. The third photosensor 63 receives reflected light rays, which have been output from the third and fourth infrared LEDs 53 and 54 and reflected by the object of the finger, etc. The fourth photosensor 64 receives reflected light rays, which have been output from the fourth and first infrared LEDs 54 and 51 and reflected by the object of the finger, etc. The first and third photosensors 61 and 63 are used when position detection in the X-axis direction is performed. The second and fourth photosensors 62 and 64 are used when position detection in the Y-axis direction. The first and fourth photosensors 61-64 serve as receiving units each of which is configured to receive a signal.

A basic configuration of the non-contact position sensing device 202 is similar to that of the non-contact position sensing device 2 of the first embodiment. However, in the non-contact position sensing device 202, the numbers of the infrared LEDs and the photosensors are different from those of the non-contact position sensing device 2 in the first embodiment, and therefore, the details of control of each component are slightly different.

The non-contact position sensing device 202 determines which of the above-described intensity position calculation and the above-described phase position calculation is to be used according to the intensities of infrared light rays received by the first through fourth photosensors 61-64. The non-contact position sensing device 202 includes, in addition to the first through fourth infrared LEDs 51-54 and the first through fourth photosensors 61-64, a control section 220 which controls the first through fourth infrared LEDs 51-54 and the first through fourth photosensors 61-64 and calculates the position of an object. The control section 220 includes a timing generation section 221 configured to generate a timing signal for an entire system, an LED control section 222 configured to control the first through fourth infrared LEDs 51-54, a sampling section 223 configured to take in an infrared light ray received by the photosensor 61 in the form of a digital signal, an average value calculation unit 224 configured to calculate the average intensity of a reflected light ray based on the digital signal taken by the sampling section 223, an average value storage section 225 configured to store the average intensity calculated by the average value calculation unit 224, a phase value calculation section 226 configured to calculate a phase value of the reflected light ray based on the digital signal taken by the sampling section 223, a phase value storage section 227 configured to store the phase value calculated by the phase value calculation section 226, and a position operation section 228 configured to calculate the position of an object based on the stored average intensity or the stored phase value. The control section 220 serves as a control unit.

Similar to the first embodiment, the timing generation section 221 generates a sampling timing signal and an LED switching timing signal, and supplies the signals to each unit. The switching timing signal according to the second embodiment takes one of four values "0," "1," "2," and "3," and is switched from one to another of the four values in this order at 30 MHz. That is, the switching timing signal is switched to "0," "1," "2," and "3" in this order every four clocks based on the sampling timing signal.

Figure 12:
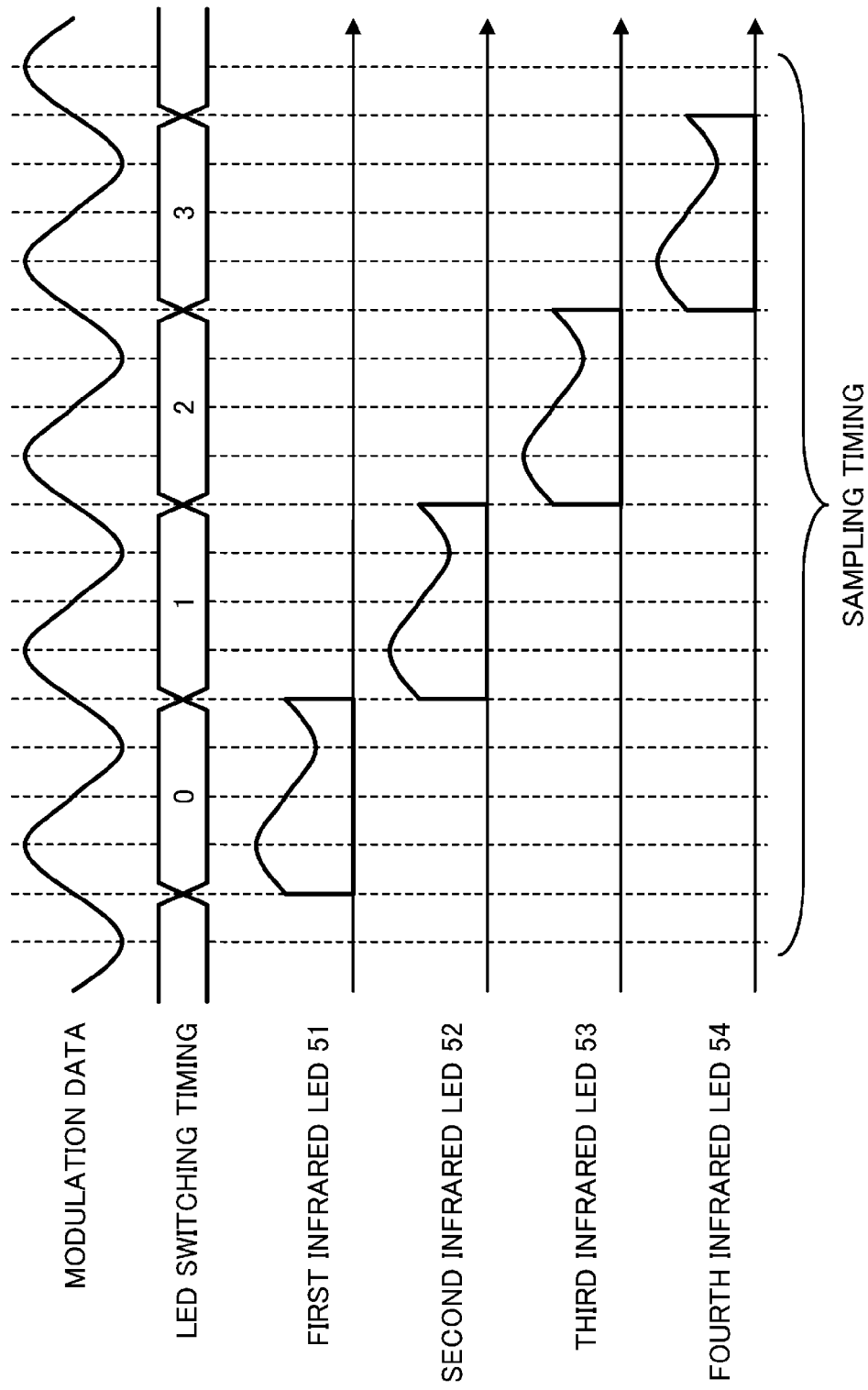
FIG. 12 is a chart showing a modulation pattern of a light ray output from each infrared LED.

The LED control section 222 controls the first through fourth infrared LEDs 51-54 so that each of the first through fourth infrared LEDs 51-54 outputs an infrared light ray. The LED control section 222 generates a driving signal for driving the first through fourth infrared LEDs 51-54 using the sampling timing signal and the switching timing signal. FIG. 12 is a chart showing a modulation pattern of a light ray output from each of the first through fourth infrared LEDs 51-54.

The LED control section 222 generates sine waveform modulation data and divides the modulation data according to the switching signal to generate a driving signal to each infrared LED. Each driving signal is generated by adding an offset to the modulation data. The modulation data for each driving signal represents a sin wave corresponding to one cycle, and the phase of the modulation data at the time of start is zero. The LED control section 222 outputs, when the switching timing signal is "0," a driving signal to the first infrared LED 51, outputs, when the switching timing signal is "1," a driving signal to the second infrared LED 52, outputs, when the switching timing signal is "2," a driving signal to the third infrared LED 53, and outputs, when the switching timing signal is "3," a driving signal to the fourth infrared LED 54. As a result, the first through fourth infrared LEDs 51-54 alternately output first through fourth infrared light rays 71-74 whose intensities have been modulated according to the switching timing signal.

When the operator puts his or her finger close to the miniature TV terminal 201, infrared light rays output from the first through fourth infrared LEDs 51-54 are sequentially reflected by the finger, and the first through fourth reflected light rays 81-84 are received by the first through fourth photosensors 61-64. Specifically, the first photosensor 61 receives the first and second reflected light rays 81 and 82 output from the first and second infrared LEDs 51 and 52. The second photosensor 62 receives the second and third reflected light rays 82 and 83 output from the second and third infrared LEDs 52 and 53. The third photosensor 63 receives the third and fourth reflected light rays 83 and 84 output from the third and fourth infrared LEDs 53 and 54. The fourth photosensor 64 receives the fourth and first reflected light rays 84 and 81 output from the fourth and first infrared LEDs 54 and 51.

The sampling timing signal and the switching timing signal are input to the sampling section 223. When the switching timing signal is "0," the sampling section 223 performs A/D conversion of a detected voltage from each of the fourth and first photosensors 64 and 61 with a sampling timing and takes in the obtained data. When the switching timing signal is "1," the sampling section 223 performs A/D conversion of a detected voltage from each of the first and second photosensors 61 and 62 with a sampling timing and takes in the obtained data. When the switching timing signal is "2," the sampling section 223 performs A/D conversion of a detected voltage from each of the second and third photosensors 62 and 63 with a sampling timing and takes in the obtained data. When the switching timing signal is "3," the sampling section 223 performs A/D conversion of a detected voltage from each of the third and fourth photosensors 63 and 64 with a sampling timing and takes in the obtained data. The sampling section 223 inputs the taken sampling data (A, B, C, and D) to the average value calculation unit 224 and the phase value calculation section 226 with the associated types of the switching timing signal and the photosensors. The type of the switching signal corresponds to the type of the infrared LED which has output the infrared light ray.

The average value calculation unit 224 averages the received sample data for each type of the switching timing signal and the photosensors. That is, the average value calculation unit 224 calculates an average intensity of the sample data for the fourth photosensor 64, and also calculates an average intensity of sample data for the first photosensor 61 when the switching timing signal is "0." Similarly, the average value calculation unit 224 calculates an average intensity of sample data for each of the first and second photosensors 61 and 62 when the switching timing signal is "1." The average value calculation unit 224 calculates an average intensity of sample data for each of the second and third photosensors 62 and 63 when the switching timing signal is "2." The average value calculation unit 224 calculates an average intensity of sample data for each of the third and fourth photosensors 63 and 64 when the switching timing signal is "3." The average value calculation unit 224 inputs each of the average intensities to the average value storage section 225 and the phase value calculation section 226.

The average value storage section 225 stores an average value for each type of the switching timing signal and the photosensors. That is, the average value storage section 225 stores average intensities for eight types in total, i.e., average intensities of reflected light rays received by the first photosensor 61 when the switching timing signal is "0" and when the switching timing signal is "1," average intensities of reflected light rays received by the second photosensor 62 when the switching timing signal is "1" and when the switching timing signal is "2," average intensities of reflected light rays received by the third photosensor 63 when the switching timing signal is "2" and when the switching timing signal is "3," average intensities of reflected light rays received by the fourth photosensor 64 when the switching timing signal is "3" and when the switching timing signal is "0."

The phase value calculation section 226 calculates a phase value of the received sample data for each type of the switching timing signal and the photosensors. Specifically, the phase value calculation section 226 subtracts the average intensity calculated by the average value calculation unit 224 from the received sampling data for each type of the switching timing signal and the photosensors, and performs Fourier transform to the subtracted data. The phase value calculation section 226, then, obtains a complex number having the largest absolute value (power value) from complex data obtained by Fourier transform, and obtains a phase value (argument) of the complex number having the largest absolute value. In this case, since the sampling timing for a reflected light ray is delayed from the switching timing of the switching timing signal, the obtained phase value is corrected to eliminate this fixed difference. Thus, the phase value calculation section 226 calculates a phase value of a reflected light ray for each type of the switching timing signal and the photosensors. The phase value calculation section 226 inputs the calculated phase value to the phase value storage section 227.

The phase value storage section 227 stores a phase value for each type of the switching timing signal and the photosensors. That is, the phase value storage section 227 stores phase values for eight types in total, i.e., phase values of reflected light rays received by the first photosensor 61 when the switching timing signal is "0" and when the switching timing signal is "1", phase values of reflected light rays received by the second photosensor 62 when the switching timing signal is "1" and when the switching timing signal is "2," phase values of reflected light rays received by the third photosensor 63 when the switching timing signal is "2" and when the switching timing signal is "3," and phase values of reflected light rays received by the fourth photosensor 64 when the switching timing signal is "3" and when the switching timing signal is "0."

The position operation section 228 reads out the average intensity stored in the average value storage section 225 and determines which of intensity position calculation and phase position calculation is to be performed, based on the average intensity. The position operation section 228 performs the determination on which of intensity position calculation and phase position calculation is to be performed separately for each of position detection in the X-axis direction and position detection in the Y-axis direction. Specifically, the position operation section 228 determines, for position detection in the X-axis direction, whether or not at least one of average intensities of two reflected light rays (specifically, respective reflected light rays of light rays output from two different infrared LEDs, and hereinafter, the same will apply) received by the first photosensor 61 and two reflected light rays received by the third photosensor 63 exceeds a predetermined threshold. When at least one of the average intensities exceeds the predetermined threshold, the position operation section 228 performs intensity position calculation, and when each of all of the average intensities is equal to or lower than the predetermined threshold, the position operation section 228 performs phase position calculation. Also, the position operation section 228 determines, for position detection in the Y-axis direction, whether or not at least one of average intensities of two reflected light rays received by the second photosensor 62 and two reflected light rays received by the fourth photosensor 64 exceeds a predetermined threshold. When at least one of the average intensities exceeds the predetermined threshold, the position operation section 228 performs intensity position calculation, and when each of all of the average intensities is equal to or lower than the predetermined threshold, the position operation section 228 performs phase position calculation.

Note that although the position operation section 228 performs the determination on which of intensity position calculation and phase position calculation is to be performed separately for each of position detection in the X-axis direction and position detection in the Y-axis direction, the present disclosure is not limited to this. For example, the position operation section 228 may perform the determination on which of intensity position calculation and phase position calculation is to be performed separately for each photosensor. That is, intensities of two reflected light rays are examined for each photosensor, and the position operation section 228 performs, when at least one of the intensities of reflected light rays exceeds a predetermined threshold, intensity position calculation, and performs, when both of the intensities of reflected light rays are equal to or lower than the predetermined threshold, phase position calculation. In this case, which of intensity position calculation and phase position calculation is to be performed is different for each photosensor. As another option, the position operation section 228 may perform the determination on which of intensity position calculation and phase position calculation is to be performed, based on reflected light rays of all photosensors. That is, the position operation section 228 performs, when at least one of all of reflected light rays received by the first through fourth photosensors 61-64 exceeds a predetermined threshold, intensity position calculation, and performs, if all of the reflected light rays is equal to or lower than the predetermined threshold, phase position calculation. In this case, which of intensity position calculation and phase position calculation is to be performed is commonly determined for all of the photosensors.

A basic principle of intensity position calculation is similar to that of the first embodiment. Specifically, intensity position calculation is performed for each photosensor, using intensities of two reflected light rays received by the photosensors. For each photosensor, the ratio between intensities of two reflected light rays according to a position between two infrared LEDs corresponding to the photosensor is obtained in advance in form of graph or table. Then, for each photosensor, intensities of actually received two reflected light rays are compared to the stored graph or table, and the position of the finger is obtained.

In this case, there are two photosensors, i.e., the first photosensor 61 and the third photosensor 63, for detecting the X-axis direction position of the finger. Therefore, two values are obtained for the X-axis direction position. If the two values are equal to each other, the value is used as the X-axis direction position as it is. If the two values are different from each other, a value calculated using one of four reflected light rays in total received by the two photosensors, which has the highest intensity, is used as the X-axis direction position. However, the method for determining the X-axis direction position is not limited thereto. For example, intensities of two reflected light rays received by each of the photosensors are summed together, and a value calculated using one of the photosensors which has the larger sum of the intensities may be used as the X-axis direction position. As another option, values obtained by two photosensors are averaged, and the obtained average value may be used as the X-axis direction position.

The Y-axis direction position of the finger is detected in a similar manner to that in detecting the X-axis direction position.

The position operation section 228 performs the above-described calculations to calculate the position of the finger. The position operation section 228 outputs the position of the finger as the position data 90.

Next, phase position calculation will be described. A basic principle of phase position calculation is similar to that of the first embodiment. Phase position calculation is performed for each photosensor, using phase values of two reflected light rays received by each of the photosensors.

The following description will be given using the photosensor 61 as an example. Since the cycle of an intensity change of an output light ray is known, a propagation time from the time when an infrared light ray is output from each of the first and second infrared LEDs 51 and 52 to the time when the infrared light ray reflected by the finger is received by the first photosensor 61 is obtained from phase values of the first and second reflected light rays 81 and 82 received by the photosensor 61 and the cycle. Then, a propagation distance is calculated from the propagation time and the speed of an infrared light ray.

Now, when it is assumed that a distance from the first infrared LED 51 to the finger is L1, a distance from the second infrared LED 52 to the finger is L2, and a distance from the finger to the first photosensor 61 is L0, a distance from the first infrared LED 51 to the first photosensor 61 via the finger is represented by L1+L0, and a distance from the second infrared LED 52 to the first photosensor 61 via the finger is represented by L2+L0. Then, when it is assumed that a propagation distance calculated based on a phase value of the first reflected light ray is a, and a propagation distance calculated based on a phase value of the second reflected light ray is b, the following equations hold.

$$L1+L0=a \qquad \text{[Equation 6]}$$

$$L2+L0=b \qquad \text{[Equation 7]}$$

Figure 13:
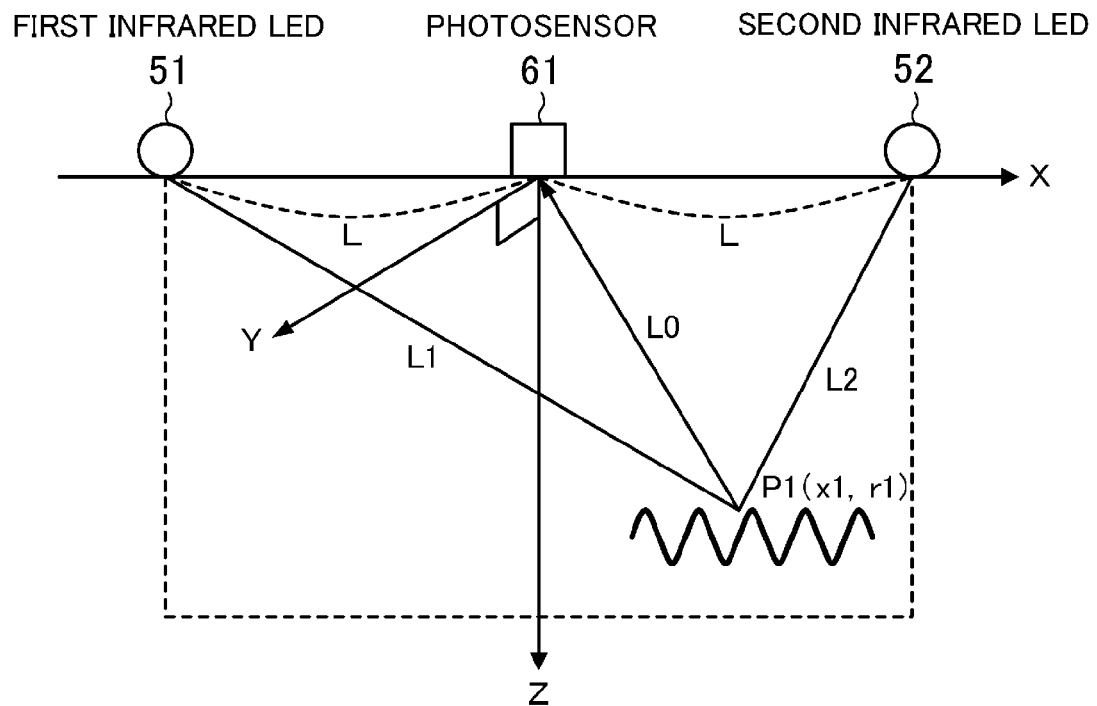
FIG. 13 is a conceptual chart illustrating position detection based on phase difference.
Figure 14:
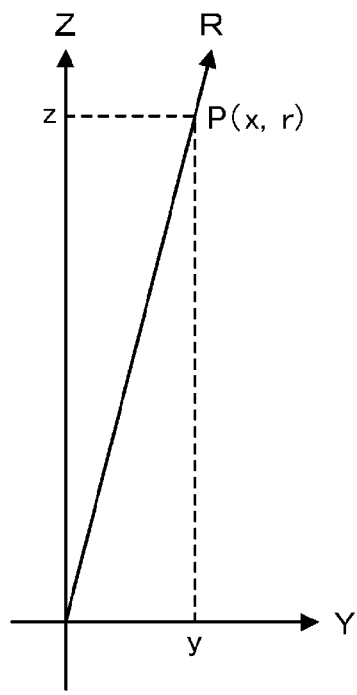
FIG. 14 is a graph showing a synthetic axis R of a Y-axis direction and a Z-axis direction.

Then, as shown in FIG. 13, with the first photosensor 61 serving as a point of origin, an X-axis (a side thereof including the second infrared LED 52 is the positive side) is provided along a direction in which the first infrared LED 51, the second infrared LED 52, and the first photosensor 61 align with one another, and a Z-axis (a side thereof closer to an operator is the positive side) is provided along a direction perpendicular to a screen of the miniature TV terminal 1. Thus, the position of the finger is represented by P1 (x1, r1). In this case, the distance from the first infrared LED 51 to the first photosensor 61 and the distance from the second infrared LED 52 to the first photosensor 61 are equal to each other. The distances will be referred to as a distance L. The distance L is known. Also, r denotes a position in an R axis direction extending from the photosensor 61 in a YZ plane, and the following equation holds.

$$r^2=y^2+z^2 \qquad \text{[Equation 8]}$$

In this case, the following equations hold.

$$L0^2=x^2+r^2 \qquad \text{[Equation 9]}$$

$$L1^2=(x+L)^2+r^2 \qquad \text{[Equation 10]}$$

$$L2^2=(x-L)^2+r^2 \qquad \text{[Equation 11]}$$

The position P1 (x1, r1) can be obtained by solving the above set of simultaneous equations 6-11.

For two reflected light rays received by the third photosensor 63, calculation is performed in a similar manner to obtain the position P3 (x3, r3) of the finger.

Thus, the X-axis direction position x1 of the finger obtained using the first photosensor 61 and the X-axis direction position x3 of the finger obtained using the third photosensor 63 are averaged, and the final X-axis direction position x of the finger is obtained.

Note that the method for calculating the final X-axis direction position x is not limited to the above-described method. For example, r1 and r3 are compared to each other, and the X coordinate (x1 or x3) of smaller one of r1 and r3 may be used as the final X-axis direction position x. Note that it is presumed that the position in the Z-axis direction is sufficiently larger than the position in the Y-axis direction. Therefore, assuming z≫y, the operation may be simplified by calculating z using r≈z.

For the Y-axis direction, calculation is performed in a similar manner. As an example, calculation using phase values of the second reflected light ray 82 from the second infrared LED 52 and the third reflected light ray 83 from the third infrared LED 53 which are received by the second photosensor 62 will be described in detail below. The method for obtaining the propagation distances of infrared light rays based on phase values of the second and third reflected light rays is as described above. When it is assumed that the propagation distance calculated based on the phase value of the second reflected light ray is a', and the propagation distance calculated based on the phase value of the third reflected light ray is b', the following equations hold.

$$L2+L0'=a' \qquad \text{[Equation 12]}$$

$$L3+L0'=b' \qquad \text{[Equation 13]}$$

In this case, L2 is a distance from the second infrared LED 52 to the finger, L3 is a distance from the third infrared LED 53 to the finger, and L0' is a distance from the finger to the second photosensor 62.

Then, with the second photosensor 62 serving as a point of origin, a Y-axis (a side thereof including the third infrared LED 53 is the positive side) is provided along a direction in which the second infrared LED 52, the third infrared LED 53, and the second photosensor 62 align with one another, and a Z-axis (a side thereof closer to an operator is the positive side) is provided along a direction perpendicular to a screen of the miniature TV terminal 1. Thus, the position of the finger is represented by P (x, r). In this case, the distance from the second infrared LED 52 to the second photosensor 62 and the distance from the third infrared LED 53 to the second photosensor 62 are equal to each other. The distances will be referred to as a distance M. The distance M is known. Also, r denotes a position in an R axis direction extending from the second photosensor 62 in a ZX plane, and the following equation holds.

$$r^2 = z^2 + x^2 \quad \text{[Equation 14]}$$

Furthermore, the following equations hold.

$$(L0')^2 = y^2 + r^2 \quad \text{[Equation 15]}$$

$$L2^2 = (y+M)^2 + r^2 \quad \text{[Equation 16]}$$

$$L3^2 = (y-M)^2 + r^2 \quad \text{[Equation 17]}$$

The position P2 (y2, r2) can be obtained by solving the above set of simultaneous equations 12-17.

For two reflected light rays received by the fourth photosensor 64, calculation is performed in a similar manner to obtain the position P4 (y4, r4) of the finger.

Thus, the Y-axis direction position y2 of the finger obtained using the second photosensor 62 and the Y-axis direction position y4 of the finger obtained using the fourth photosensor 64 are averaged, and the final Y-axis direction position y of the finger is obtained.

Note that the method for calculating the final Y-axis direction position y is not limited to the above-described method. For example, r2 and r4 are compared to each other, and the Y coordinate (y2 or y4) of smaller one of r2 and r4 may be used as the final Y-axis direction position y. Note that it is presumed that the position in the Z-axis direction is sufficiently larger than the position in the X-axis direction. Thus, assuming z>>x, the operation may be simplified by calculating z using r≈z.

Note that a Z-axis direction position z is calculated using (x, r) when the final Y-axis direction position y and the final X-axis direction position x are obtained. However, the Z-axis direction position z may be calculated using (y, r) used when the final X-axis direction position x and the final Y-axis direction position y are obtained.

The position operation section 228 performs the above-described calculations to calculate the position of the finger. The position operation section 228 outputs the position of the finger as the position data 90.

Third Embodiment

Figure 15:
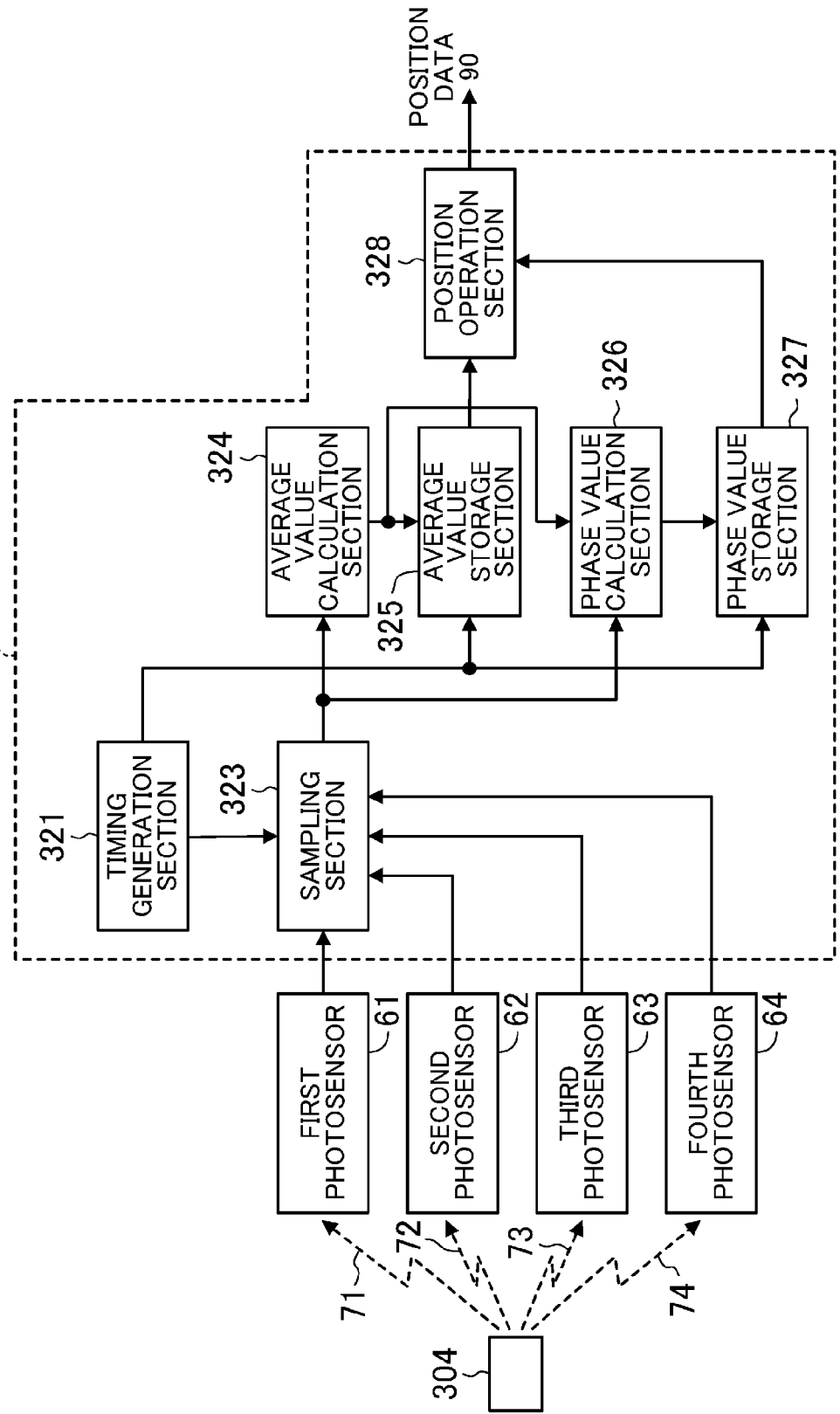
FIG. 15 is a configuration diagram of a non-contact position sensing device according to a third embodiment.
Figure 16:
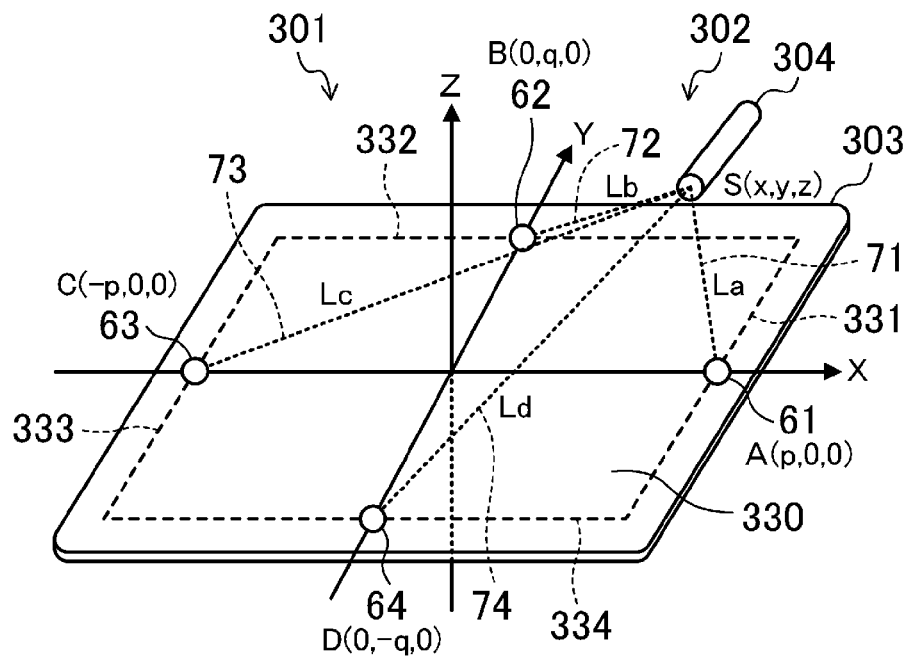
FIG. 16 is a perspective view of an input device according to the third embodiment.

Subsequently, an input device according to a third embodiment will be described. FIG. 15 is a configuration diagram of a non-contact position sensing device according to a third embodiment. FIG. 16 is a perspective view of an input device 301. In each of the first and second embodiments, the infrared LEDs and the photosensors are incorporated in a single unit. On the other hand, in the third embodiment, infrared LEDs and photosensors are separately provided. In addition, whereas each of the first and second embodiments describes a miniature TV terminal including a non-contact position sensing device, the third embodiment describes an input device including a non-contact position sensing device.

The input device 301 of the third embodiment includes a non-contact position sensing device 302, and a flat pad 303. The non-contact position sensing device 302 includes four photosensors 61-64 provided on the pad 303, a pointer stick 304 held and operated by a user, and a control section 320 configured to control the first through fourth photosensors 61-64 and calculates the position of the pointer stick 304. In the input device 301, for example, a pointer is displayed on a display (not shown), and an operator can move the pointer and select an option displayed on the display by operating the pointer stick 304. The non-contact position sensing device 302 determines which of the intensity position calculation and the phase position calculation is to be used according to the intensities of infrared light rays received by the first through fourth photosensors 61-64.

The pointer stick 304 is provided with an infrared LED at a tip thereof. The pointer stick 304 causes the infrared LED to emit a light ray, thereby outputting an infrared light ray from the tip. The infrared light ray has an intensity modulated sinusoidally. The pointer stick 304 may be configured to continuously output the infrared light ray, or may be configured to intermittently output the infrared light ray. The pointer stick 304 is provided with a switch (not shown) configured to switch the infrared LED on/off. The pointer stick 304 serves as a transmission unit.

The pad 303 itself does not perform sensing, but is a member on which the first through fourth photosensors 61-64 are provided. An input area 330 which is a range in which the position of the pointer stick 304 can be detected by the first through fourth photosensors 61-64 is shown on the pad 303.

The input area 330 has a rectangular shape. The first through fourth photosensors 61-64 are arranged on short sides 331 and 333 and long sides 332 and 334 of the input area 330. Specifically, the first photosensor 61 is arranged on a midpoint of the right short side 331, the second photosensor 62 is arranged on a midpoint of the upper long side 332, the third photosensor 63 is arranged on a midpoint of the left short side 333, and the fourth photosensor 64 is arranged on a midpoint of the lower long side 334. The first through fourth photosensors 61-64 serve as receiving units.

When the operator turns on the infrared LED of the pointer stick 304 and moves the pointer stick 304 near the input area 330 of the pad 303, the first through fourth photosensors 61-64 receive infrared light rays from the pointer stick 304. In this case, for the sake of description, the infrared light ray which is output from the pointer stick 304 and is received by the first photosensor 61 will be referred to as a first received light ray 71, the infrared light ray which is received by the second photosensor 62 will be referred to as a second received light ray 72, the infrared light ray which is received by the third photosensor 63 will be referred to as a third received light ray 73, and the infrared light ray which is received by the fourth photosensor 64 will be referred to as a fourth received light ray 74. The non-contact position sensing device 302 detects the position of the pointer stick 304 based on the first through fourth infrared light rays 71-74 received by the first through fourth photosensors 61-64. The input device 301 receives the position and movement of the pointer stick 304 as an input by the operator.

The control section 320 includes a timing generation section 321 configured to generate a timing signal for an entire system, a sampling section 323 configured to take in an infrared light ray received by each of the photosensors 61-64 in the form of a digital signal, an average value calculation unit 324 configured to calculate an average intensity of a reflected light ray based on the digital signal taken by the sampling section 323, an average value storage section 325 configured to store the average intensity calculated by the average value calculation unit 324, a phase value calculation section 326 configured to calculate a phase value of the reflected light ray based on the digital signal taken by the sampling section 323, a phase value storage section 327 configured to store the phase value calculated by the phase value calculation section 326, and a position operation section 328 configured to calculate the position of an object based on the stored average intensity or the stored phase value. The control section 320 serves as a control unit.

The timing generation section 321 generates a timing signal for an entire system, and supplies the timing signal to each unit. The timing signal for the entire system includes a sampling timing signal. As opposed to the first embodiment, the timing generation section 321 does not generate a LED switching timing signal.

The sampling section 323 samples detected voltages from the first through fourth photosensors 61-64 based on the sampling timing signal. In this case, the sampling section 323 samples the detected voltages from the first through fourth photosensors 61-64 in parallel.

Each of the average value calculation unit 324 and the average value storage section 325 has a basic configuration similar to the configuration of a corresponding unit of the first embodiment, and the average value calculation unit 324 averages sample data from each of the first through fourth photosensors 61-64, and the average value storage section 325 stores obtained average intensities.

The phase value calculation section 326 has a basic configuration similar to the configuration of a corresponding unit of the first embodiment, and calculates a phase difference between an infrared light ray received by each of the second through fourth photosensors 62-64 and an infrared light ray received by the first photosensor 61. The method for calculating a phase value of each infrared light ray is as described above. Note that in this embodiment, an infrared light ray received by the first photosensor 61 is used as a reference in calculation of the phase difference, but an infrared light ray received by some other photosensor than the first photosensor 61 may be used as a reference in the calculation of the phase difference.

The phase value storage section 327 stores the phase difference between an infrared light ray received by each of the second through fourth photosensors 62-64 and an infrared light ray received by the first photosensor 61.

The position operation section 328 reads out average intensities of reflected light rays stored in the average value storage section 325. Then, the position operation section 328 performs, when at least one of the intensities of infrared light rays received by the first through fourth photosensors 61-64 exceeds a predetermined threshold, intensity position calculation, and performs, when each of all of the intensities of the infrared light rays is equal to or less than the predetermined threshold, performs phase position calculation.

Figure 17:
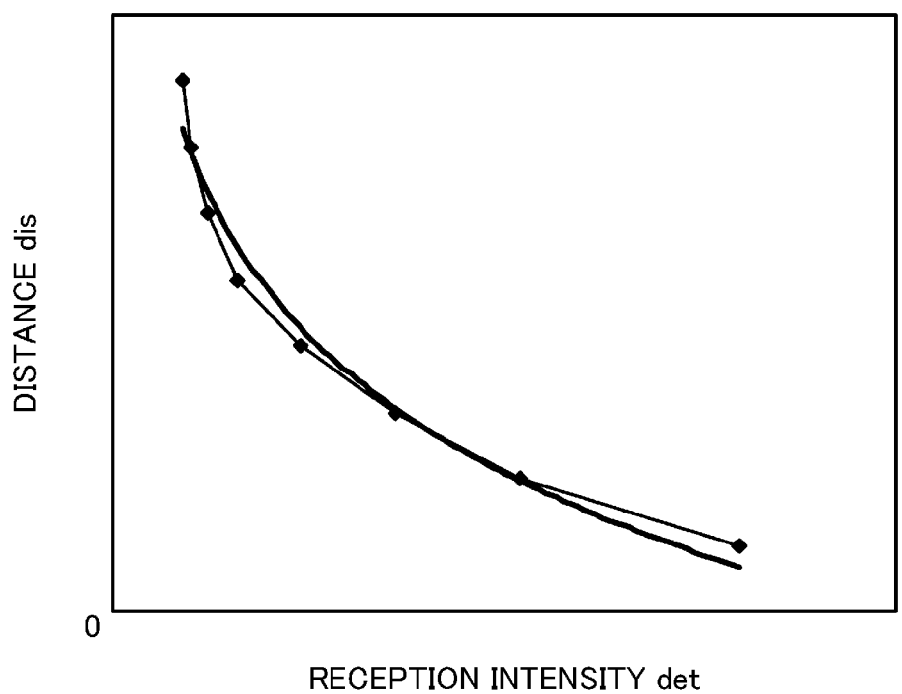
FIG. 17 is a graph showing the relationship between the intensity of a received signal at a photosensor and a distance between a pointer and the photosensor.

The position operation section 328 performs intensity position calculation in the following manner. That is, as shown in FIG. 17, the relationship of a distance between the pointer stick 304 and the photosensor relative to reception intensity of an infrared light ray received by a photosensor is measured in advance, and an approximate equation 18 representing the relationship is obtained from a result of the measurement and is stored. In the approximate equation 18, u and v are constants.

$$dis = u \times \ln(det) + v \quad \text{[Equation 18]}$$

Assume that a straight line connecting the respective midpoints of the two short sides 331 and 333 of the input area 330 is an X-axis, and a straight line connecting the respective midpoints of the two long sides 332 and 334 of the input area 330 is a Y-axis. The X-axis and the Y-axis intersect at a center of gravity of the input area 330, and this point is a zero point of each of the X-axis and the Y-axis. A straight line extending from the zero point perpendicularly to both of the X-axis and the Y-axis is a Z-axis. The X-axis is provided so that the right hand side of FIG. 16 is the positive side, the Y-axis is provided so that the upper side of FIG. 16 is the positive side, and the Z is provided so that a side thereof closer to an operator is the positive side. The first through fourth photosensors 61-64 are provided on the X-axis or the Y-axis.

Then, when it is assumed that the length of each of the long sides 332 and 334 of the input area 330 is 2p, and the length of each of the short sides 331 and 333 thereof is 2q, in the X-Y-Z coordinate system, the position of the first photosensor 61 is represented by A (p, 0, 0), the position of the second photosensor 62 is represented by B (0, q, 0), the position of the third photosensor 63 is represented by C (−p, 0, 0), and the position of the fourth photosensor 64 is represented by D (0, −q, 0).

Also, the distances from the tip of the pointer stick 304 to the first through fourth photosensors 61-64 are represented by La-Ld. Then, when it is assumed that the tip of the pointer stick 304 is located at S (x, y, z), the following equations hold.

$$La^2 = (x-p)^2 + y^2 + z^2 \quad \text{[Equation 19]}$$

$$Lb^2 = x^2 + (y-q)^2 + z^2 \quad \text{[Equation 20]}$$

$$Lc^2 = (x+p)^2 + y^2 + z^2 \quad \text{[Equation 21]}$$

$$Ld^2 = x^2 + (y+q)^2 + z^2 \quad \text{[Equation 22]}$$

The position operation section 328 reads out the approximate equation 18, and obtains the distances La-Ld from respective reception intensities of the first through fourth infrared light rays 71-74. The obtained La-Ld are substituted in Equations 19-22 to solve the above set of simultaneous equations, so that the position S (x, y, z) of the tip of the pointer stick 304 can be obtained. The position operation section 328 outputs the position S (x, y, z) of the pointer stick 304 as the position data 90. Note that z does not necessarily have to be included.

Note that, similar to the first embodiment, the position operation section 328 may obtain the X-axis direction position based on the ratio between average intensities of infrared light rays received by the first and third photosensors 61 and 63 which align along the X-axis, and obtain the Y-axis direction position based on the ratio between average intensities of infrared light rays received by the second and fourth photosensors 62 and 64 which align along the Y-axis.

On the other hand, the position operation section 328 performs phase position calculation in the following manner.

Specifically, when it is assumed that a propagation time of an infrared light ray which it takes for the infrared light ray to propagate from the pointer stick 304 to the first photosensor 61 is t, and a propagation speed of an infrared light ray is s, the following equations hold.

$$La = st \quad \text{[Equation 23]}$$

$$Lb = s(t+\alpha) \quad \text{[Equation 24]}$$

$$Lc = s(t+\beta) \quad \text{[Equation 25]}$$

$$Ld = s(t+\gamma) \quad \text{[Equation 26]}$$

α denotes a time difference between a propagation time of an infrared light ray which it takes for the infrared light ray to propagate from the pointer stick 304 to the second photosensor 62 and the propagation time t which it takes for the infrared light ray to propagate from the pointer stick 304 to the first photosensor 61, β denotes a time difference between a propagation time of an infrared light ray which it takes for the infrared light ray to propagate from the pointer stick 304 to the third photosensor 63 and the propagation time t which it takes for the infrared light ray to propagate from the pointer stick 304 to the first photosensor 61, and γ denotes a time difference between a propagation time of an infrared light ray which it takes for the infrared light ray to propagate from the pointer stick 304 to the fourth photosensor 64 and the propagation time t which it takes for the infrared light ray to propagate from the pointer stick 304 to the first photosensor 61. Each of these time differences can be obtained from a phase difference between corresponding two infrared light rays.

When Equations 23-26 are substituted in Equations 19-22, the following equations hold.

$$s^2t^2=(x-p)^2+y^2+z^2 \quad \text{[Equation 27]}$$

$$s^2(t+\alpha)^2=x^2+(y-q)^2+z^2 \quad \text{[Equation 28]}$$

$$s^2(s+\beta)^2=(x+p)^2+y^2+z^2 \quad \text{[Equation 29]}$$

$$s^2(t+\gamma)^2=x^2+(y+q)^2+z^2 \quad \text{[Equation 30]}$$

Then, when Equations 27 and 28 are solved for t, the following equation is obtained.

$$t=(2px-2qy-p^2+q^2-\alpha^2s^2)/(2\alpha s^2) \quad \text{[Equation 31]}$$

Then, when using an equation obtained by substituting Equation 31 in an equation obtained by subtracting Equation 27 from Equation 29 and an equation obtained by substituting Equation 31 in an equation obtained by subtracting Equation 28 from Equation 30, x and y are expressed only by p, q, s, α, β, and γ, the following equations hold.

$$x=(2\alpha\beta^2s^2+2\alpha^2\beta^2s^2-\alpha^3\beta s^2-\alpha\beta\gamma^2s^2+q^2\beta+q^2\alpha\beta)/4p\alpha \quad \text{[Equation 32]}$$

$$y=\{(\gamma-\alpha)(2\alpha\beta^2s^2+2\alpha^2\beta^2s^2+2\alpha^2\gamma s^2-\alpha^3\beta s^2-\alpha\beta\gamma^2s^2+2q^2\alpha-2p^2\alpha+q^2\beta+q^2\alpha\beta)\}/4q\gamma\alpha \quad \text{[Equation 33]}$$

In this case, p, q, and s are known, and α, β, and γ can be obtained from time differences between times when reflected light rays are received by first through fourth photosensors 61-64. As a result, x and y can be obtained using Equations 32 and 33. Note that when Equation 27 is solved for z by substituting Equation 31 and obtained x and y in Equation 27, z can be obtained.

Thus, the position operation section 328 outputs the position S (x, y, z) of the pointer stick 304 as the position data 90. Note that z does not necessarily have to be included.

As described above, in the third embodiment, infrared light rays output from a single infrared LED is received by a plurality of photosensors to obtain the position of an object based on average intensities of infrared light rays at the photosensors, and a phase of an intensity change. That is, infrared light rays output from the pointer stick 304 is received not only by one of the photosensors but by all of the photosensors.

Other Embodiments

The above-described non-contact position sensing devices of the present disclosure are not limited to application where a non-contact position sensing device is configured using an absolute hardware such as a CPU and a sensor, etc., but may include a firmware, an OS, and furthermore, a peripheral equipment. The above-described process steps may be realized using a software, and, as another option, may be realized using a hardware. Also, part of all of a function block group may be realized by being appropriately integrated. For example, part of all of a function block group may be realized as a hybrid IC.

In the above-described embodiments, when checking the intensity of a reflected light ray to determine which of intensity position calculation and phase position calculation is to be performed, an infrared light ray whose intensity is modulated, i.e., the same infrared light ray as that used in phase position calculation is output. However, when checking the intensity of a reflected light ray, an infrared light ray having a constant light intensity may be output. In this case, the non-contact position sensing devices may be configured so that, as a result of checking the intensity of a reflected light ray, when performing intensity position calculation, the same infrared light ray having a constant light intensity as that used in checking intensity is output, and when phase position calculation is performed, an infrared light ray having modulated light intensity is output. Thus, the amount of power required for modulating the intensity of an infrared light ray can be reduced.

In the above-described embodiments, an infrared light ray is used as a signal. However, the present disclosure is not limited to this. For example, a visible light ray may be used as a signal, and furthermore, and a sonic wave may be used as a signal.

In the above-described embodiments, the intensity of an infrared light ray output from an infrared LED is modulated by a sin wave having a phase of zero. However, the present disclosure is not limited to this. The intensity of the infrared light ray may be modulated by a cos wave having a phase of zero. Also, the intensity of the infrared light ray may be modulated by a sin or cos wave having a phase of some other value of than zero. However, if the phase of an infrared light ray when the infrared light ray is output from an infrared LED is not zero, the phase value calculation section of each of the first and second embodiments has to obtain, after a phase value of an infrared light ray received by a photosensor is obtained, a phase difference between the phase of the infrared light ray received by the photosensor and the phase of the infrared light ray output from the infrared LED. Then, a propagation time of an infrared light ray is calculated based on the phase difference.

Furthermore, the present disclosure is not limited to the configuration where the intensity of the infrared light ray output from the infrared LED is modulated by a sin wave or a cos wave to represent a sinusoidal waveform. As long as a modulating wave for the intensity periodically changes, any periodic function may be employed.

A non-contact position sensing device is incorporated in a miniaturized TV terminal in each of the first and second embodiments, and a non-contact position sensing device is incorporated in an input device in the third embodiment. However, application of a non-contact position sensing device according to the present disclosure is not limited thereto. As a matter of course, each of the configurations of the non-contact position sensing devices of the first and second embodiments may be applied to the input device of the third embodiment, and also, the configuration of the non-contact position sensing device of the third embodiment may be applied to the miniature TV terminals of the first and second embodiments. The application of the non-contact position sensing device is not limited to use as an input interface, but the non-contact position sensing device may be used for the purpose of merely detecting an object.

In the above-described embodiments, when the intensity of at least one infrared light ray exceeds a predetermined threshold, intensity position calculation is performed. However, the present disclosure is not limited thereto. For example, a configuration in which intensity position calculation is performed when both of two infrared light rays used for performing intensity position calculation exceed a predetermined threshold may be employed. Thus, a difference in intensity between the two infrared light rays can be detected more clearly, and detection capability of intensity position calculation can be increased. As another option, a configuration in which the intensities of two infrared light rays used for performing intensity position calculation is averaged, and when the obtained average value exceeds a predetermined threshold, intensity position calculation is performed may be employed. As still another option, a configuration in which the intensities of two infrared light rays used for performing intensity position calculation are summed together, and when the obtained sum exceeds a predetermined threshold, intensity position calculation is performed may be employed.

In the above-described embodiments, a predetermined threshold is set to be an intensity with which intensity position calculation can be performed. However, the present disclosure is not limited to this. For example, a predetermined threshold may be set to be an intensity corresponding to a distance with which phase position calculation can be performed. In this case, it is preferable that, when both of the intensities of two infrared light rays used for performing phase position calculation are equal to or lower than the predetermined threshold, phase position calculation is performed, and when at least one of the intensities of the infrared light rays exceeds the predetermined threshold, intensity position calculation is performed. Thus, a difference in intensity between the two infrared light rays can be detected more clearly, and detection capability of intensity position calculation can be increased.

The numbers and arrangement of infrared LED and photosensors are not limited to those described in the above-described embodiments. For example, in the first and second embodiments, a single photosensor is provided at a midpoint of corresponding two infrared LEDs, and a single photosensor receives two infrared light rays. However, the present disclosure is not limited this. Two photosensors may be arranged at this position. In this case, the infrared LEDs and the photosensors correspond to one another in one-to-one correspondence. Photosensors may be arranged at the positions of the infrared LEDs of the first and second embodiments, while infrared LEDs may be arranged at the positions of the photosensors of the first and second embodiments. In this case, the number of infrared LEDs and the number of photosensors are switched from one to the other, as compared to the configurations of the first and second embodiments. In such a configuration, infrared light rays output from a single infrared LED are received by two photosensors, and intensity position calculation or phase position calculation is performed using infrared light rays from the two photosensors.

Figure 18:
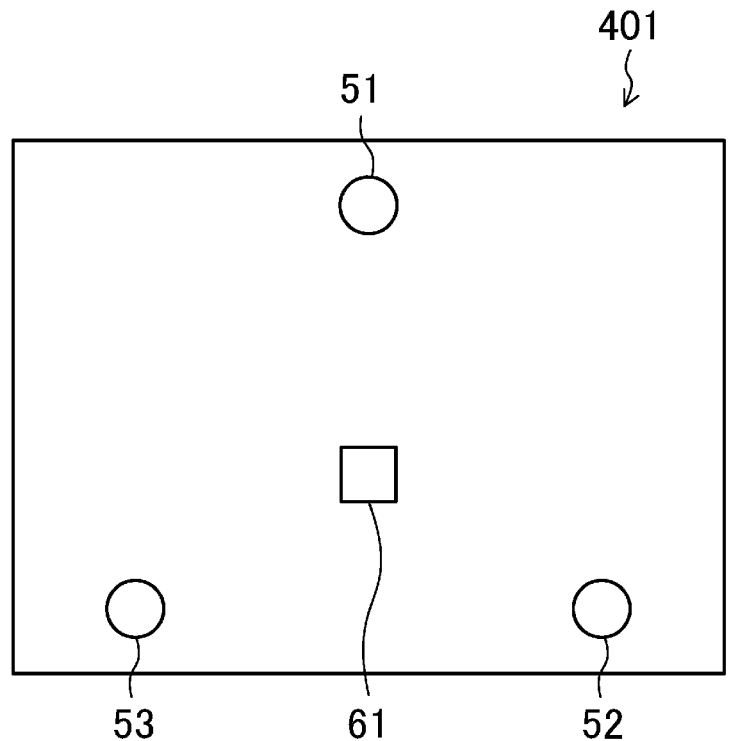
FIG. 18 is a schematic view of a non-contact position sensing device according to another embodiment.
Figure 19:
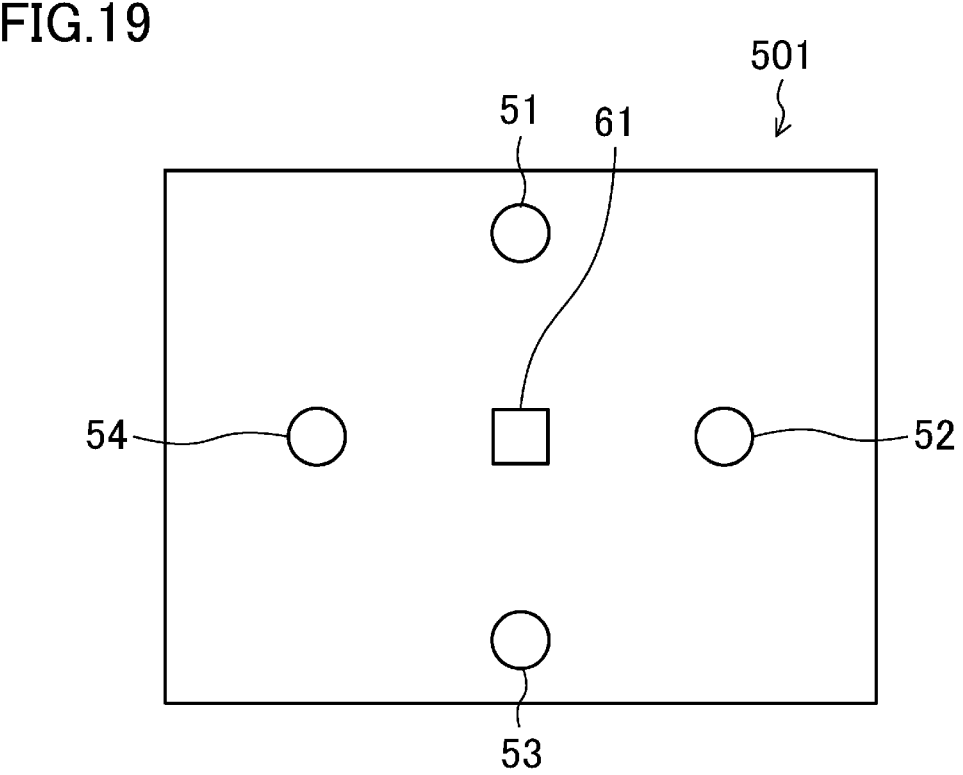
FIG. 19 is a schematic view of another non-contact position sensing device according to another embodiment.

For example, as an example arrangement of infrared LEDs and photosensors other than the arrangements of the above-described embodiments, as shown in FIG. 18, a non-contact position sensing device 401 including three infrared LEDs 51-53, and a single photosensor 61 arranged inside a triangle formed by the infrared LEDs 51-53 is provided. As another example, as shown in FIG. 19, a non-contact position sensing device 501 including two pairs of infrared LEDs, i.e., four infrared LEDs 51-54, and a single photosensor 61 arranged at an intersection of two straight lines, each of which connects LEDs of an associated one of the two pairs is provided. In these examples, infrared LEDs and photosensors may be switched around. Note that any other arrangements than the above-described arrangements may be employed.

The above-described embodiments may be summarized as follows.

That is, a non-contact position sensing device includes a plurality of light emitting units, a receiving unit provided for each of the plurality of light emitting units and configured to receive an associated one of reflected light rays of light rays of the plurality of light emitting units, which are reflected on an object, a light intensity position calculation unit configured to calculate a position of the object based on respective intensities of the reflected light rays of the plurality of light emitting units, a light phase position calculation unit configured to calculate the position of the object based on respective phases of the reflected light rays of the plurality of light emitting units, and a control unit configured to determine which of position calculation of the object by the light intensity position calculation unit and position calculation of the object by the light phase position calculation unit it to be performed and switches between the position calculations, based on respective intensities of the reflected light rays of the plurality of light emitting units.

Moreover, in the non-contact position sensing device, light rays emitted from the plurality of light emitting units are modulated by a sine wave or a cosine wave.

In the non-contact position sensing device, the light intensity position calculation unit calculates the position of the object based on an average value of the intensities of the reflected light rays of the plurality of light emitting units in a predetermined period.

In the non-contact position sensing device, the control unit switches between the position calculation of the object by the light intensity position calculation unit and the position calculation of the object by the light phase position calculation unit, based on the average value of the intensities of the reflected light rays of the plurality of light emitting units in a predetermined period.

Note that the foregoing embodiments have been set forth merely for purposes of preferred examples in nature, and are not intended to limit the scope, application and used of the invention.

The present disclosure is useful in detection of the position of an object without contact.

What is claimed is:

1. A non-contact position sensing device, comprising:
    a plurality of transmission units provided in different positions, each being configured to transmit a signal;
    a receiving unit configured to receive the signals reflected by an object; and
    a control unit configured to calculate a position of the object based on received signals received by the receiving unit,
    wherein the control unit switches between intensity position calculation to calculate the position of the object based on intensities of the received signals without utilizing phase difference between the received signals, and phase position calculation to cause intensities of the signals from the transmission units to periodically change and calculate the position of the object based on phases of intensity changes of the received signals, based on the intensities of the received signals, and utilizes a result of only either one of the intensity position calculation and the phase position calculation to determine a single position of the object.

2. The non-contact position sensing device of claim 1, wherein when the intensity position calculation is performed, the control unit causes intensities of the signals from the transmission units to periodically change and calculates the position of the object based on average intensities of the received signals in a predetermined period.

3. The non-contact position sensing device of claim 1, wherein when the control unit determines to switch between the intensity position calculation and the phase position calculation, the control unit causes intensities of the signals from the transmission units to periodically change and switches between the intensity position calculation and the phase position calculation based on average intensities of the received signals in a predetermined period.

4. The non-contact position sensing device of claim 1, wherein the signal whose intensity periodically changes is a signal having an intensity which sinusoidally changes.

5. A non-contact position sensing device, comprising:
a transmission unit configured to transmit a signal;
a plurality of receiving units provided in different positions, each being configured to receive the signal reflected by an object; and
a control unit configured to calculate a position of the object based on the received signals received by the receiving units,
wherein the control unit switches between intensity position calculation to calculate a position of the object based on intensities of the received signals received by the plurality of receiving units without utilizing phase difference between the received signals, and phase position calculation to cause an intensity of the signal from the transmission unit to periodically change and calculate the position of the object based on phases of intensity changes of the received signals received by the plurality of receiving units, based on the intensities of the received signals, and utilizes a result of only either one of the intensity position calculation and the phase position calculation to determine a single position of the object.

6. The non-contact position sensing device of claim 5, wherein when the intensity position calculation is performed, the control unit causes the intensity of the signal from the transmission unit to periodically change and calculates the position of the object based on average intensities of the received signals in a predetermined period.

7. The non-contact position sensing device of claim 5, wherein when the control unit determines to switch between the intensity position calculation and the phase position calculation, the control unit causes the intensity of the signal from the transmission unit to periodically change and switches between the intensity position calculation and the phase position calculation based on average intensities of the received signals in a predetermined period.

8. The non-contact position sensing device of claim 5, wherein the signal whose intensity periodically changes is a signal having an intensity which sinusoidally changes.

9. A non-contact position sensing device, comprising:
a transmission unit configured to move with an object and transmit a signal;
a plurality of receiving units provided in different positions, each being configured to receive the signal; and
a control unit configured to calculate a position of the object based on the received signals received by the receiving units,
wherein the control unit switches between intensity position calculation to calculate a position of the object based on intensities of the received signals received by the plurality of receiving units without utilizing phase difference between the received signals, and phase position calculation to cause an intensity of the signal from the transmission unit to periodically change and calculate the position of the object based on phases of intensity changes of the received signals received by the plurality of receiving units, based on the intensities of the received signals, and utilizes a result of only either one of the intensity position calculation and the phase position calculation to determine a single position of the object.

10. The non-contact position sensing device of claim 9, wherein when the intensity position calculation is performed, the control unit causes the intensity of the signal from the transmission unit to periodically change and calculates the position of the object based on average intensities of the received signals in a predetermined period.

11. The non-contact position sensing device of claim 9, wherein when the control unit determines to switch between the intensity position calculation and the phase position calculation, the control unit causes the intensity of the signal from the transmission unit to periodically change and switches between the intensity position calculation and the phase position calculation based on average intensities of the received signals in a predetermined period.

12. The non-contact position sensing device of claim 9, wherein the signal whose intensity periodically changes is a signal having an intensity which sinusoidally changes.

13. A non-contact position sensing method, comprising:
transmitting signals from a plurality of different positions;
receiving the signals reflected by an object; and
performing position calculation of the object based on the received signals,
wherein in the position calculation, intensity position calculation to calculate a position of the object based on intensities of the received signals without utilizing phase difference between the received signals, and phase position calculation to cause, when the signals are transmitted, intensities of the signals to periodically change and calculate the position of the object based on phases of intensity changes of the received signals are switched from one to the other based on the intensities of the received signals, and a result of only either one of the intensity position calculation and the phase position calculation to determine a single position of the object.

14. The non-contact position sensing method of claim 13, wherein in the intensity position calculation, when the signals are transmitted, the intensities of the signals are caused to periodically change to calculate the position of the object based on average intensities of the received signals in a predetermined period.

15. The non-contact position sensing method of claim 13, wherein in determining switching between the intensity position calculation and the phase position calculation, when the signals are transmitted, the intensities of the signals are caused to periodically change to switch between the intensity position calculation and the phase position calculation based on average intensities of the received signals in a predetermined period.

16. The non-contact position sensing method of claim 13, wherein when the intensities of the signals are caused to periodically change, the intensities of the signals sinusoidally change.

17. A non-contact position sensing method, comprising:
transmitting a signal;
receiving the signals reflected by an object at a plurality of different positions; and
performing position calculation of the object based on the received signals,
wherein in the position calculation, intensity position calculation to calculate a position of the object based on intensities of the received signals without utilizing phase difference between the received signals, and phase position calculation to cause, when the signal is transmitted, an intensity of the signal to periodically change and calculate the position of the object based on phases of intensity changes of the received signals are switched from one to the other based on the intensities of the received signals, and a result of only either one of the intensity position calculation and the phase position calculation to determine a single position of the object.

18. The non-contact position sensing method of claim 17, wherein in the intensity position calculation, when the signal is transmitted, the intensity of the signal is caused to periodically change to calculate the position of the object based on average intensities of the received signals in a predetermined period.

19. The non-contact position sensing method of claim 17, wherein in determining switching between the intensity position calculation and the phase position calculation, when the signal is transmitted, the intensity of the signal is caused to periodically change to switch between the intensity position calculation and the phase position calculation based on average intensities of the received signals in a predetermined period.

20. The non-contact position sensing method of claim 17, wherein when the intensity of the signal is caused to periodically change, the intensity of the signal sinusoidally changes.

21. A non-contact position sensing method, comprising:
   transmitting a signal from a position where an object is located;
   receiving the signals at a plurality of different positions; and
   performing position calculation of the object based on the received signals,
   wherein in the position calculation, intensity position calculation to calculate a position of the object based on intensities of the received signals without utilizing phase difference between the received signals, and phase position calculation to cause, when the signal is transmitted, an intensity of the signal to periodically change and calculate the position of the object based on phases of intensity changes of the received signals are switched from one to the other based on the intensities of the received signals, and a result of only either one of the intensity position calculation and the phase position calculation to determine a single position of the object.

22. The non-contact position sensing method of claim 21, wherein in the intensity position calculation, when the signal is transmitted, the intensity of the signal is caused to periodically change to calculate the position of the object based on average intensities of the received signals in a predetermined period.

23. The non-contact position sensing method of claim 21, wherein in determining switching between the intensity position calculation and the phase position calculation, when the signal is transmitted, the intensity of the signal is caused to periodically change to switch between the intensity position calculation and the phase position calculation based on average intensities of the received signals in a predetermined period.

24. The non-contact position sensing method of claim 21, wherein when the intensity of the signal is caused to periodically change, the intensity of the signal sinusoidally changes.

* * * * *